United States Patent
Chun et al.

(10) Patent No.: US 10,826,588 B2
(45) Date of Patent: Nov. 3, 2020

(54) CHANNEL SOUNDING METHOD IN WIRELESS COMMUNICATION SYSTEM, AND APPARATUS THEREFOR

(71) Applicant: LG ELECTRONICS INC., Seoul (KR)

(72) Inventors: Jinyoung Chun, Seoul (KR); Kiseon Ryu, Seoul (KR); Hangyu Cho, Seoul (KR); Wookbong Lee, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,073

(22) PCT Filed: Apr. 15, 2016

(86) PCT No.: PCT/KR2016/003963
§ 371 (c)(1),
(2) Date: Oct. 16, 2017

(87) PCT Pub. No.: WO2016/167608
PCT Pub. Date: Oct. 20, 2016

(65) Prior Publication Data
US 2018/0138959 A1   May 17, 2018

Related U.S. Application Data

(60) Provisional application No. 62/148,184, filed on Apr. 16, 2015.

(51) Int. Cl.
*H04B 7/06* (2006.01)
*H04L 25/02* (2006.01)
(Continued)

(52) U.S. Cl.
CPC ............ *H04B 7/0626* (2013.01); *H04B 7/06* (2013.01); *H04L 1/0026* (2013.01);
(Continued)

(58) Field of Classification Search
None
See application file for complete search history.

(56) References Cited

U.S. PATENT DOCUMENTS 9,332,449 B2 * 5/2016 Park ................. H04B 7/0643
10,313,976 B2 * 6/2019 Moon ................ H04B 7/0697
(Continued)

FOREIGN PATENT DOCUMENTS

JP   2013520143   5/2013
JP   2013527647   6/2013
(Continued)

OTHER PUBLICATIONS

PCT International Application No. PCT/KR2016/003963, International Search Report dated Jul. 28, 2016, 12 pages.
(Continued)

*Primary Examiner* — Steve R Young
(74) *Attorney, Agent, or Firm* — Lee, Hong, Degerman, Kang & Waimey

(57) ABSTRACT

According to an embodiment of present invention, a sounding method for an STA (Station) to transmit feedback information of a downlink (DL) channel state in a WLAN (Wireless LAN) system according to one embodiment of the present invention comprises receiving an NDPA (NDP announcement) frame that notifies of transmission of an NDP (Null Data Packet) frame, receiving the NDP frame, receiving a trigger frame including resource allocation information allocated to the STA, generating channel state information on the basis of a training field included in the NDP frame; and performing uplink (UL) multi-user (MU) trans-
(Continued)

mission of the feedback frame including the channel state information by using a frequency resource indicated by the resource allocation information.

13 Claims, 28 Drawing Sheets

(51) Int. Cl.
| | |
|---|---|
| *H04L 27/26* | (2006.01) |
| *H04L 1/00* | (2006.01) |
| *H04L 1/06* | (2006.01) |
| *H04B 17/336* | (2015.01) |
| *H04L 5/00* | (2006.01) |
| *H04W 84/12* | (2009.01) |

(52) U.S. Cl.
CPC .......... *H04L 1/0027* (2013.01); *H04L 1/0075* (2013.01); *H04L 1/06* (2013.01); *H04L 25/0224* (2013.01); *H04L 27/2602* (2013.01); *H04B 7/0634* (2013.01); *H04B 17/336* (2015.01); *H04L 1/00* (2013.01); *H04L 5/003* (2013.01); *H04W 84/12* (2013.01)

(56) References Cited

U.S. PATENT DOCUMENTS

| | | | |
|---|---|---|---|
| 2011/0194644 A1* | 8/2011 | Liu | ...................... H04L 5/0044 375/295 |
| 2013/0229996 A1 | 9/2013 | Wang et al. | |
| 2013/0250904 A1 | 9/2013 | Kang et al. | |
| 2014/0204891 A1 | 7/2014 | Park et al. | |
| 2014/0301240 A1 | 10/2014 | Park et al. | |
| 2016/0081075 A1* | 3/2016 | Kim | ...................... H04B 7/0619 370/329 |
| 2016/0204960 A1* | 7/2016 | Yu | ...................... H04L 25/0224 370/338 |
| 2016/0261327 A1* | 9/2016 | Merlin | ................. H04B 7/0626 |
| 2016/0295513 A1* | 10/2016 | Moon | ................. H04B 7/0634 |
| 2016/0295581 A1* | 10/2016 | Ghosh | ................... H04L 1/1614 |
| 2017/0367077 A1* | 12/2017 | Shu | ..................... H04W 72/042 |

FOREIGN PATENT DOCUMENTS

| | | |
|---|---|---|
| KR | 101099345 | 12/2011 |
| WO | 2014011006 | 1/2014 |

OTHER PUBLICATIONS

Japan Patent Office Application No. 2017-554007, Office Action dated Oct. 3, 2018, 10 pages.
Ryu, K. et al., "UL MU Procedure", doc.: IEEE 802.11-15/0365r0, Mar. 2015, 16 pages.
802.11 Working Group: "Draft Standard for Information Technology—Telecommunications and information exchange between systems—Local and metropolitan area networks—Specific requirements; Part 11; Amendment 4", IEEE P802.11ac/D7.0, Sep. 2013, 12 pages.
Azizi, S. et al., "OFDMA Numerology and Structure", doc.: IEEE 802.11-15/0330r1, Mar. 2015, 38 pages.
Korean Intellectual Property Office Application No. 10-2017-7024183, Office Action dated Mar. 21, 2019, 6 pages.

* cited by examiner

FIG. 11

| Frame Control | Duration | RA | TA | Feedback Segment Retransmission Bitmap | FCS |
|---|---|---|---|---|---|
| 2 | 2 | 6 | 6 | 1 | 4 |

Octets:

FIG. 21

| L-STF | L-LTF | L-SIG | HE-SIG A | | | | |
|-------|-------|-------|----------|----------|-------|-------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

FIG. 22

| L-STF | L-LTF | L-SIG | HE-SIG A | | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

FIG. 23

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

CHANNEL SOUNDING METHOD IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/003963, filed on Apr. 15, 2016, which claims the benefit of U.S. Provisional Application No. 62/148,184, filed on Apr. 16, 2015, the contents of which are all hereby incorporated by reference herein in their entirety.

TECHNICAL FIELD

The present invention relates to a wireless communication system and more specifically, a channel sounding method for performing uplink multi-user transmission of a channel state measured by an STA and an apparatus supporting the method.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

SUMMARY OF INVENTION

Technical Problems

An object of the present invention is to propose a new sounding protocol that may be applied in the next-generation wireless communication system and to propose an HE (High Efficiency) format for frames transmitted and received to realize the sounding protocol.

Also, an object of the present invention is to propose an efficient method for performing uplink multi-user transmission of channel state information measured by STAs in the next-generation wireless communication system.

Technical objects to be achieved by the present invention are not limited to those described above, and other technical objects not mentioned above may also be clearly understood from the descriptions given below by those skilled in the art to which the present invention belongs.

Technical Solutions

To solve the technical problem, a sounding method for an STA to transmit feedback information of a downlink (DL) channel state in a WLAN (Wireless LAN) system comprises receiving an NDPA (NDP announcement) frame that notifies of transmission of an NDP (Null Data Packet) frame; receiving the NDP frame; receiving a trigger frame including resource allocation information allocated to the STA; generating channel state information on the basis of a training field included in the NDP frame; and performing uplink (UL) multi-user (MU) transmission of the feedback frame including the channel state information by using a frequency resource indicated by the resource allocation information.

Also, the NDPA frame, the NDP frame, and the trigger frame may be received by being included in one DL PPDU or by being included in different DL PPDUs respectively.

Also, when the NDPA frame, the NDP frame, and the trigger frame are received by being included in the different DL PPDUs respectively, the STA may receive the different DL PPDUs at SIFS (Short Interframe Space) intervals.

Also, the resource allocation information may indicate the number of resource units allocated to the STA for performing UL MU transmission of the feedback frame.

Also, the resource unit may be a 26 tone resource unit comprising 26 subcarriers.

Also, a bit value of the resource allocation information may indicate the number of resource units allocated to the STA.

Also, the resource allocation information may include a plurality of bits corresponding sequentially to resource units allocated for UL MU transmission of the feedback frame, and each bit value of the plurality of bits may be switched to a bit value different from a previous bit value according as an STA to which resource unit corresponding to an each bits is allocated is changed to a different STA.

Also, when different indices are allocated to the resource units allocated for UL MU transmission of the feedback frame, the resource allocation information may include index information of a resource unit allocated to the STA.

Also, the channel state information may include a feedback value generated in a predetermined frequency unit with respect to a spatial stream, and the feedback value may be an SNR (Signal to Noise Ratio) or beamforming feedback matrix of the predetermined frequency unit with respect to the spatial stream.

Also, the predetermined frequency unit may be an entire transmission channel of a DL PPDU that carries the NDP frame.

Also, the predetermined frequency unit may be a 26 tone resource unit or 20 MHz channel.

Also, the NDPA frame may include indication information of a frequency band to be measured by the STA.

Also, the generating the channel state information may be generating the channel state information with respect to the frequency band indicated by the indication information.

Also, measuring the channel state is generating the channel state information with respect to a frequency band of a predetermine size, and the predetermined size may be equal to or smaller than a frequency band used for transmitting the NDP frame.

Also, the generated channel state information may be information about a beamforming feedback matrix with respect to the frequency band of the predetermined size.

Also, the training field of the NDP frame may be HE-LTE (High Efficiency-Long Training Field).

Also, an STA (Station) in a WLAN (Wireless LAN) system according to another embodiment of the present invention comprises an RF unit configured to transmit and receive a radio signal; and a processor configured to control the RF unit, wherein the processor is further configured to: receive an NDPA (NDP announcement) notifying of transmission of an NDP (Null Data Packet) frame, receive the NDP frame, receive a trigger frame including resource allocation information about resources allocated to the STA; generate channel state information on the basis of a training field included in the NDP frame; and perform uplink (UL) multi-user (MU) transmission of a feedback frame including the channel state information by using a frequency resource indicated by the resource allocation information.

In the following embodiments, additional effects of the present invention will be described.

Effect of the Invention

According to an embodiment of the present invention, a sounding protocol that can be efficiently applied in a next generation WLAN system to which OFDMA technology is applied is proposed.

Also, according to an embodiment of the present invention, the AP transmits trigger information for transmitting the UL MU feedback frame of the STAs, so that each STA can perform an UL MU transmission of the feedback frame.

Also, according to an embodiment of the present invention, since the STAs can perform an UL MU transmission of the feedback frame for a DL channel, the AP can acquire channel state information for the DL channel more quickly.

Other effects of the present invention will be further described in the following embodiments.

DESCRIPTION OF DRAWINGS

The accompanying drawings, which are included to provide a further understanding of the invention and are incorporated in and constitute a part of this specification, illustrate embodiments of the invention and, together with the description, serve to explain the technical features of the invention.

FIG. 11 illustrates a beamforming report poll frame format in a wireless communication system to which the present invention may be applied.

FIGS. 21 to 23 illustrate an HE format PPDU according to one embodiment of the present invention.

BEST MODE

The terms used herein have been chosen from the generic terms that are currently widely available, taking into account the functions of this specification, but these may vary depending on the intentions of the person skilled in the art, custom or the emergence of new techniques. Also, in certain cases, there may be a term selected arbitrarily by the applicant, in which case the meaning thereof will be described in the description of the corresponding embodiment. Therefore, it is intended that the terminology used herein should be interpreted relative to the meaning of the term rather than to the nomenclature, and should be interpreted based on the entire contents of the specification.

Furthermore, the embodiments are described in detail below with reference to the accompanying drawings and the contents of the accompanying drawings, but are not limited to or limited by the embodiments.

Hereinafter, preferred embodiments of the present invention will be described in detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

Figure 1:
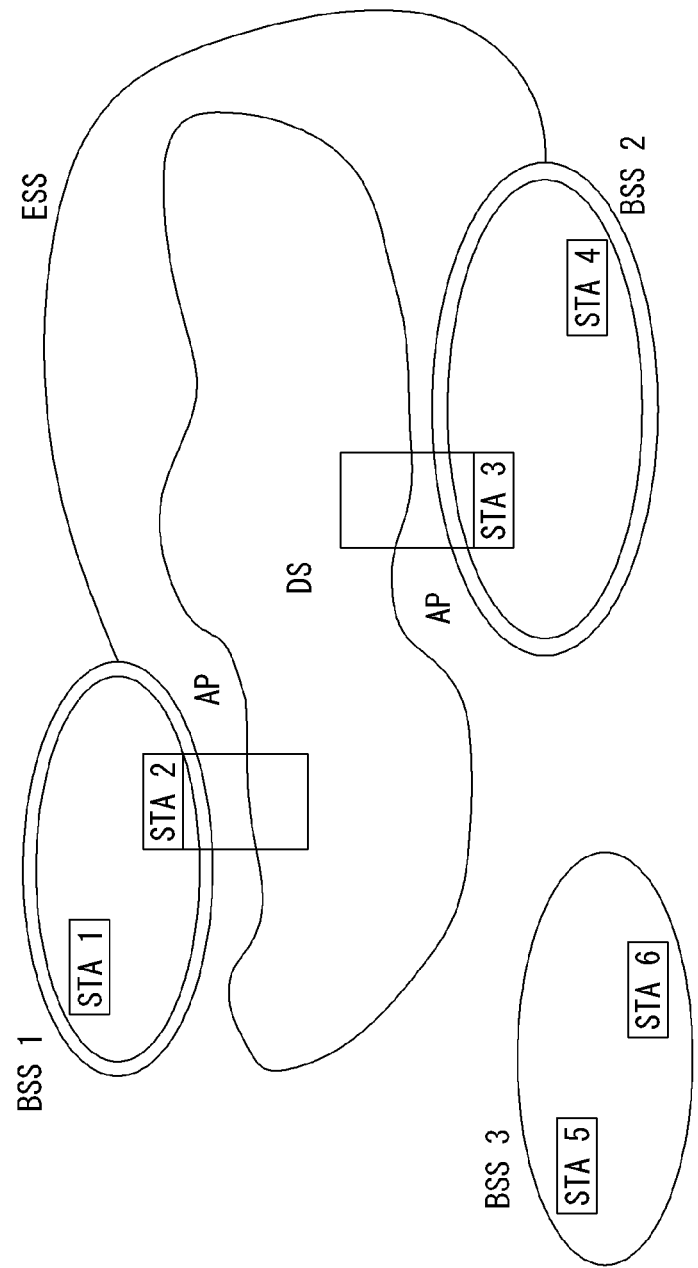
FIG. 1 is a diagram showing an example of an IEEE 802.11 system to which the present invention may be applied.

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Figure 2:
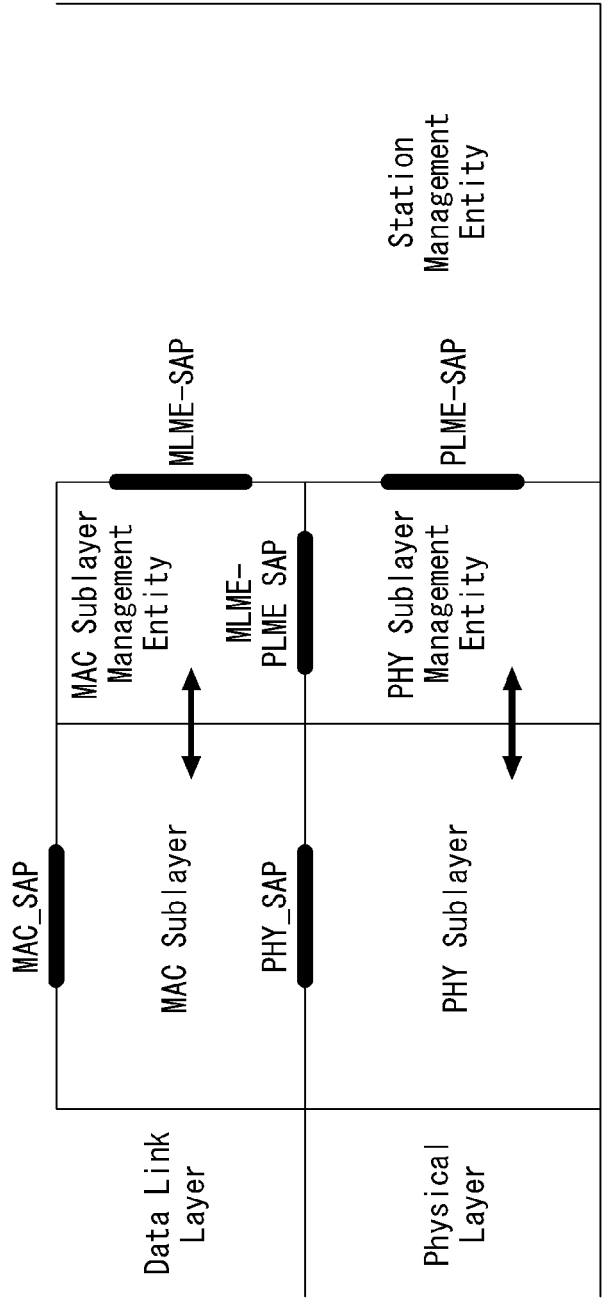
FIG. 2 is a diagram illustrating the structure of a layer architecture of an IEEE 802.11 system to which the present invention may be applied.

FIG. 2 is a diagram illustrating the structure of a layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11a WLAN system to which an embodiment of the present invention may be applied.

Figure 3:
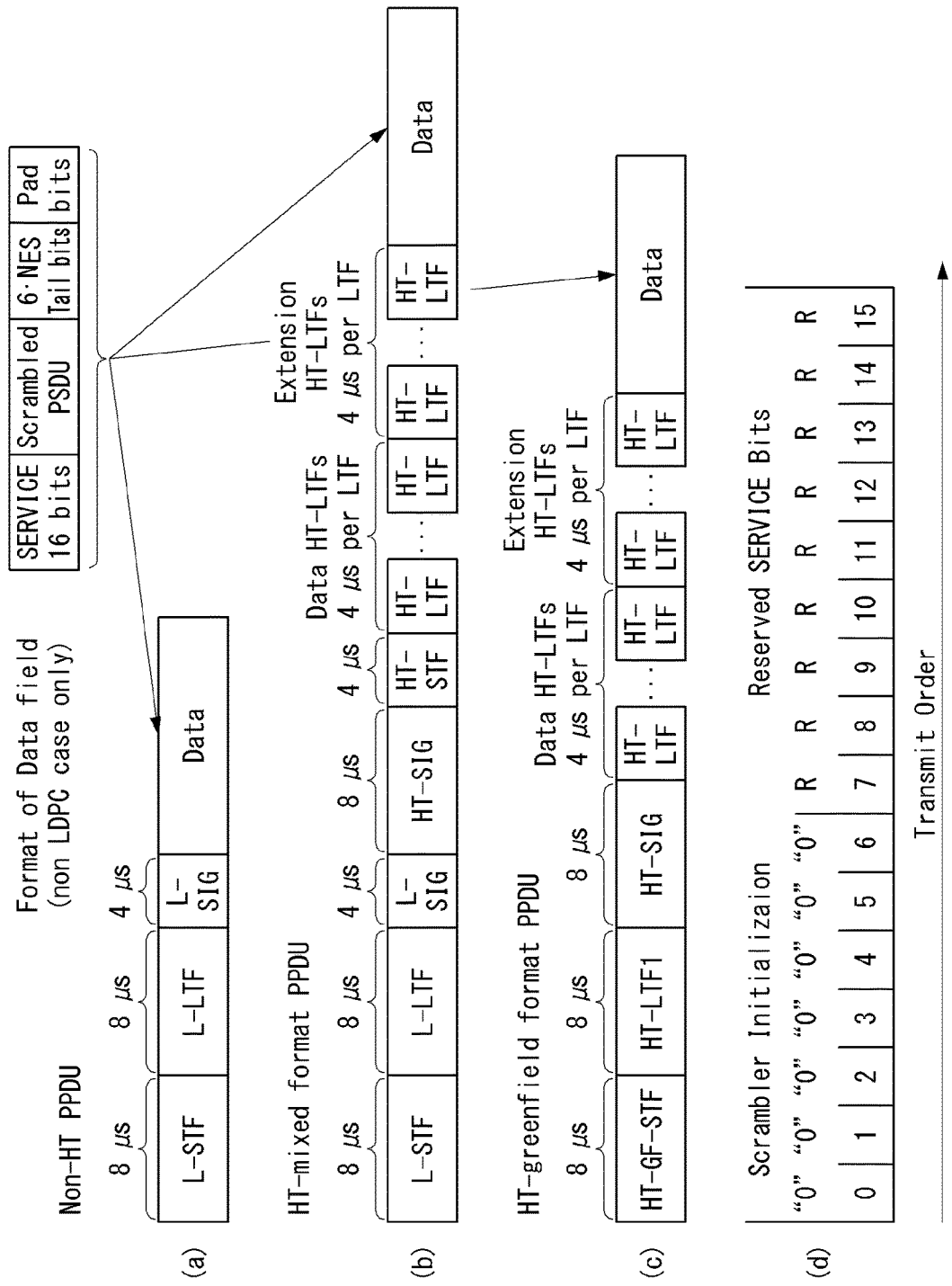
FIG. 3 illustrates a non-HT format PPDU and an HT format PPDU in a wireless communication system to which the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

The fields up to HT-SIG field are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| Field | Bit | Description |
|---|---|---|
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

Figure 4:
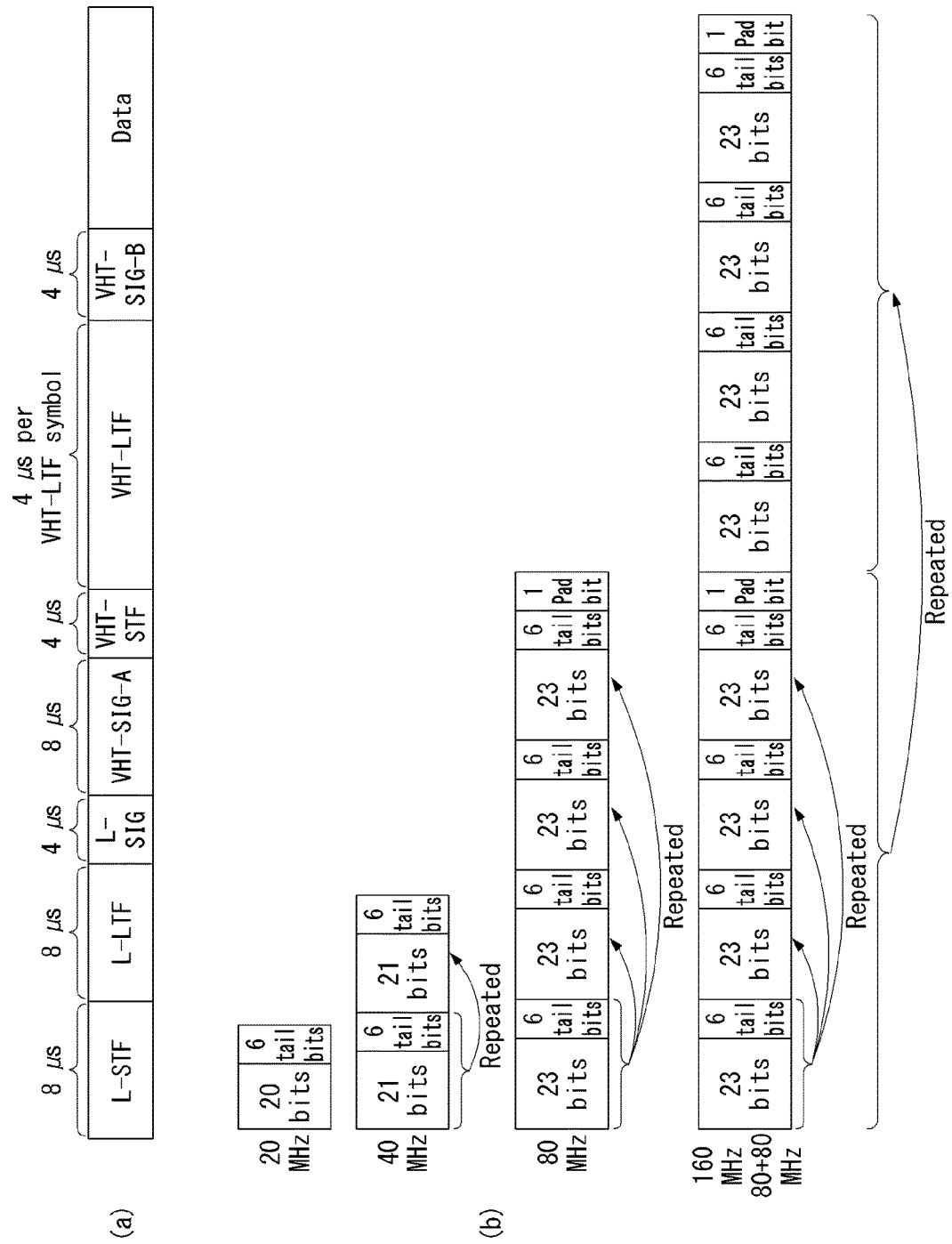
FIG. 4 illustrates a VHT format PPDU in a wireless communication system to which the present invention may be applied.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| field | bit | description |
| --- | --- | --- |
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| field | bit | description |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

MAC Frame Format

Figure 5:
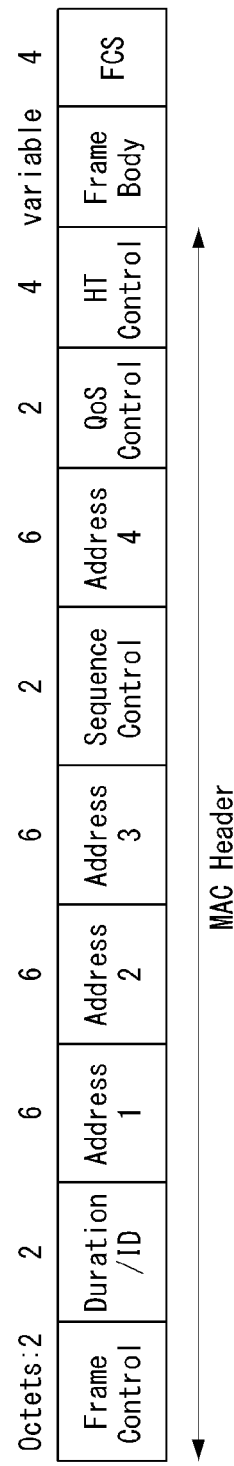
FIG. 5 illustrates an MAC frame format in IEEE 802.11 system to which the present invention may be applied.

FIG. 5 illustrates a MAC frame format in an IEEE 802.11 system to which the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

Figure 6:
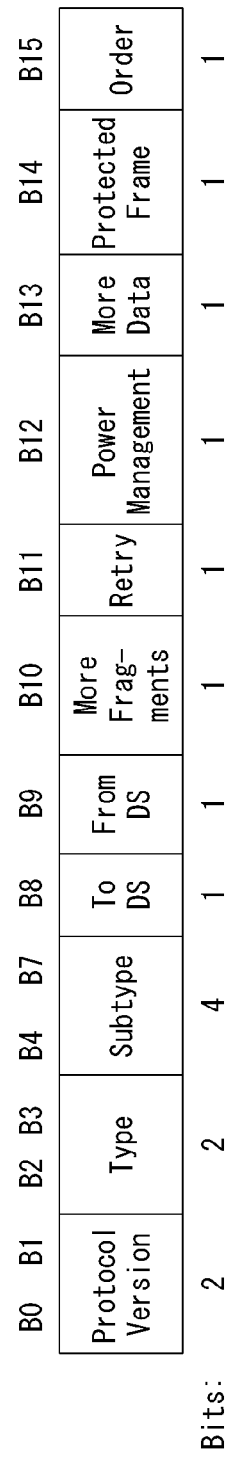
FIG. 6 illustrates a frame control field within an MAC frame in a wireless communication system to which the present invention may be applied.

FIG. 6 is a diagram illustrating the frame control field in the MAC frame in a wireless communication system to which the present invention may be applied.

Referring to FIG. 6, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames, Control frames, and Data frames.

Each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. Also, the above-described fields are examples of the fields that may be included in the MAC frame but not limited to them. That is, the above-described fields may be substituted with other fields or further include additional fields, and not all of the fields may be necessarily included.

Channel State Information Feedback Method

SU-MIMO technology, in which a beamformer assigns all antennas to one beamformee for communication, enhances channel capacity through spatial-temporal diversity gain and multi-stream transmission. SU-MIMO technology uses more antennas than when MIMO technology is not used, thereby leveraging spatial degrees of freedom and contributing to the improvement of a physical layer.

MU-MIMO technology, in which a beamformer assigns antennas to multiple beamformees, can improve the performance of MIMO antennas by increasing the per-beamformee transfer rate or channel reliability through a link layer protocol for multiple access of multiple beamformees connected to the beamformer.

In MIMO environments, performance depends largely on how accurate channel information the beamformer acquires. Thus, a feedback procedure is required to acquire channel information.

There are largely two types of feedback supported to acquire channel information: one is to use a control frame and the other is to use a channel sounding procedure which does not include a data field. Sounding refers to using a preamble training field to measure channel for other purposes than data demodulation of a PPDU including the corresponding training field.

Hereinafter, a channel information feedback method using a control frame and a channel information feedback method using an NDP (null data packet) will be described in more detail.

1) Feedback Using Control Frame

Figure 8:
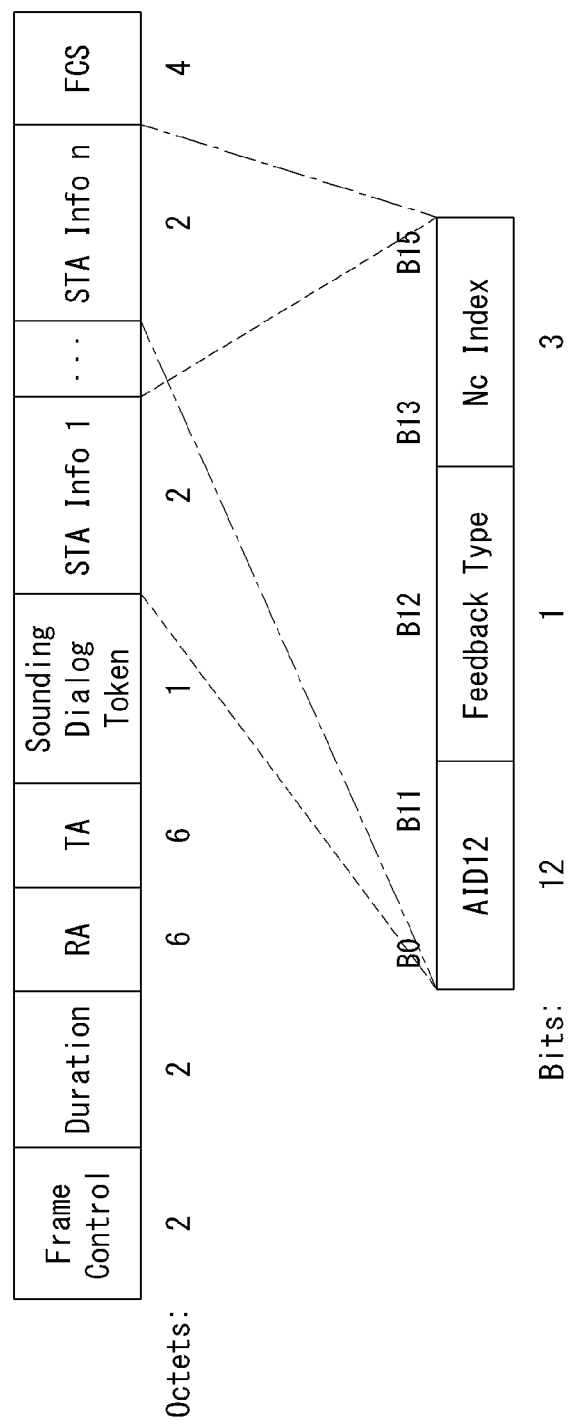
FIG. 8 illustrates a VHT NDPA frame in a wireless communication system to which the present invention may be applied.

In MIMO environments, a beamformer may instruct a beamformee to send channel state information feedback through the HT control field included in the MAC header, or the beamformee may report channel state information through the HT control field included in the MAC header (see FIG. 8). The HT control field may be included in a Control Wrapper frame, a QoS Data frame in which the Order subfield of the MAC header is set to 1, and a Management frame.

2) Feedback Using Channel Sounding

Figure 7:
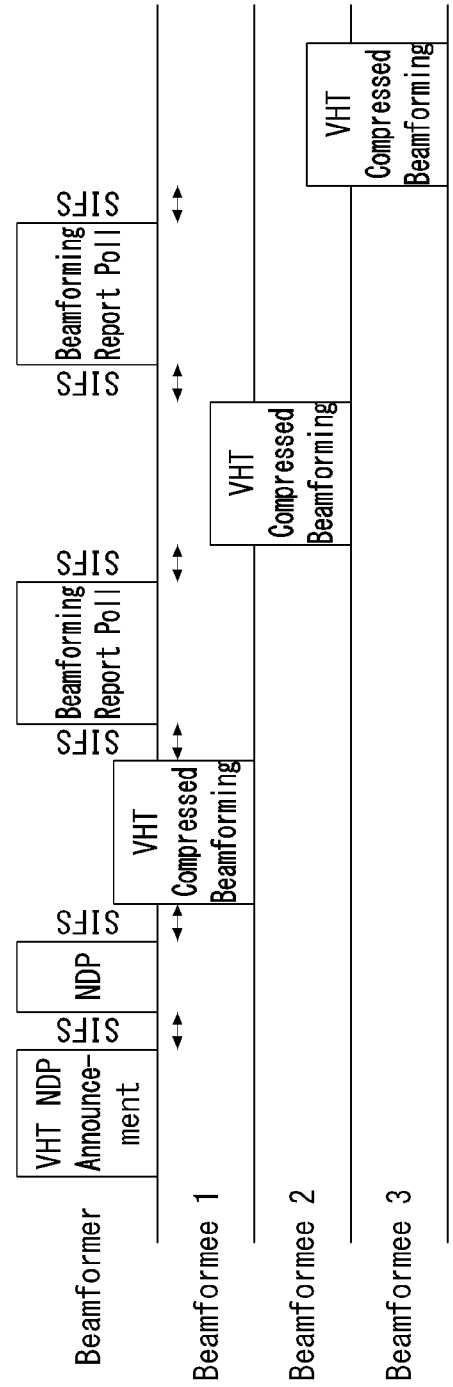
FIG. 7 illustrates a channel sounding method in a wireless communication system to which the present invention may be applied.

FIG. 7 is a diagram conceptually showing a method of channel sounding in a wireless communication system to which the present invention may be applied.

FIG. 7 illustrates a method of feedback of channel state information between a beamformer (e.g., AP) and a beamformee (e.g., non-AP STA) based on a sounding protocol. The sounding protocol may refer to a procedure of receiving feedback about information on channel state information.

A method of sounding channel state information between a beamformer and a beamformee based on a sounding protocol may be performed in the following steps:

(1) A beamformer transmits a VHT NDPA (VHT Null Data Packet Announcement) frame indicating sounding and transmission for feedback from a beamformee.

The VHT NDPA frame refers to a control frame that is used to indicate that channel sounding is initiated and an NDP (Null Data Packet) is transmitted. In other words, a VHT NDPA frame may be transmitted before NDP transmission to allow a beamformee to ready to feed back channel state information before receiving the NDP frame.

The VHT NDPA frame may contain AID (association identifier) information, feedback type information, etc. of a beamformee that will transmit an NDP. A more detailed description of the VHT NDPA frame will be given later.

The VHT NDPA frame may be transmitted in different ways for MU-MIMO-based data transmission and SU-MIMO-based data transmission. For example, in the case of channel sounding for MU-MIMO, the VHT NDPA frame may be transmitted in a broadcast manner, whereas, in the case of channel sounding for SU-MIMO, the VHT NDPA frame may be transmitted in a unicast manner.

(2) After transmitting the VHT NDPA frame, the beamformer transmits an NDP after an SIFS. The NDP has a VHT PPDU structure but without a data field.

Beamformees that have received the VHT NDPA frame may check the value of the AID12 subfield included in the STA information field and determine whether they are a target STA for sounding.

Moreover, the beamformees may know their order of feedback through the STA Info field included in the NDPA. FIG. 11 illustrates that feedback occurs in the order of Beamformee 1, Beamformee 2, and Beamformee 3.

(3) Beamformee 1 acquires downlink channel state information based on the training field included in the NDP and generates feedback information to send to the beamformer.

Beamformee 1 transmits a VHT compressed beamforming frame containing feedback information to the beamformer after an SIFS after receiving the NDP frame.

The VHT compressed beamforming frame may include an SNR value for a space-time stream, information on a compressed beamforming feedback matrix for a subcarrier, and so on. A more detailed description of the VHT compressed beamforming frame will be provided later.

(4) The beamformer receives the VHT compressed beamforming frame from Beamformee 1, and then, after an SIFS, transmits a Beamforming Report Poll frame to Beamformee 2 in order to acquire channel information from Beamformee 2.

The Beamforming Report Poll frame is a frame that performs the same role as the NDP frame. Beamformee 2 may measure channel state based on the transmitted Beamforming Report Poll frame.

A more detailed description of the Beamforming Report Poll frame will be given later.

(5) After receiving the Beamforming Report Poll frame, Beamformee 2 transmits a VHT Compressed Beamforming frame containing feedback information to the beamformer after an SIFS.

(6) The beamformer receives the VHT Compressed Beamforming frame from Beamformee 2 and then, after an SIFS, transmits a Beamforming Report Poll frame to Beamformee 3 in order to acquire channel information from Beamformee 3.

(7) After receiving the Beamforming Report Poll frame, Beamformee 3 transmits a VHT Compressed Beamforming frame containing feedback information to the beamformer after an SIFS.

Hereinafter, a frame used for the above-described channel sounding procedure will be discussed.

FIG. 8 is a diagram illustrating a VHT NDPA frame in a wireless communication system to which the present invention may be applied.

Referring to FIG. 8, a VHT NDPA frame may consist of a Frame Control field, a Duration field, an RA (Receiving Address) field, a TA (Transmitting Address) field, a Sounding Dialog Token field, an STA Info 1 field through STA info n field, and an FCS.

The RA field value indicates the address of a receiver or STA which receives the VHT NDPA frame.

If the VHT NDPA frame includes only one STA Info field, then the RA field is set to the address of the STA identified by the AID in the STA Info field. For example, when transmitting the VHT NDPA frame to one target STA for SU-MIMO channel sounding, an AP unicasts the VHT NDPA frame to the target STA.

On the other hand, if the VHT NDPA frame includes more than one STA Info field, then the RA field is set to the broadcast address. For example, when transmitting the VHT NDPA frame to at least one target STA for MU-MIMO channel sounding, an AP broadcasts the VHT NDPA frame.

The TA field value indicates the address of a transmitter or transmitting STA which transmits the VHT NDPA frame or a bandwidth signaling TA.

The Sounding Dialog Token field also may be called a Sounding Sequence field. The Sounding Dialog Token Number subfield in the Sounding Dialog Token field contains a value selected by the beamformer to identify the VHT NDPA frame.

The VHT NDPA frame includes at least one STA Info field. That is, the VHT NDPA frame includes an STA Info field containing information on target STAs for sounding. One STA Info field may be included for each target STA for sounding.

Each STA Info field may include an AID12 subfield, a Feedback Type subfield, and an NC Index subfield.

Table 4 shows the subfields of an STA Info field included in the VHT NDPA frame.

TABLE 4

| Subfield | Description |
| --- | --- |
| AID12 | Contains the AID of a target STA for sounding feedback. The AID12 subfield value is set to '0' if the target STA is an AP, mesh STA, or STA that is a member of an IBSS. |
| Feedback Type | Indicates the type of feedback requested for the target STA for sounding. Set to 0 for SU-MIMO. Set to 1 for MU-MIMO. |
| Nc Index | If the Feedback Type subfield indicates MU-MIMO, then NcIndex indicates the number of columns, Nc, in the Compressed Beamforming Feedback Matrix subfield minus 1. Set to 0 for Nc = 1, Set to 1 for Nc = 2, . . . Set to 7 for Nc = 8. Reserved if the Feedback Type subfield indicates SU-MIMO. |

Information contained in the above-described fields may be as defined in the IEEE 802.11 system. Also, the above-described fields are examples of the fields that may be included in the MAC frame but not limited to them. That is, the above-described fields may be substituted with other fields or further include additional fields.

Figure 9:
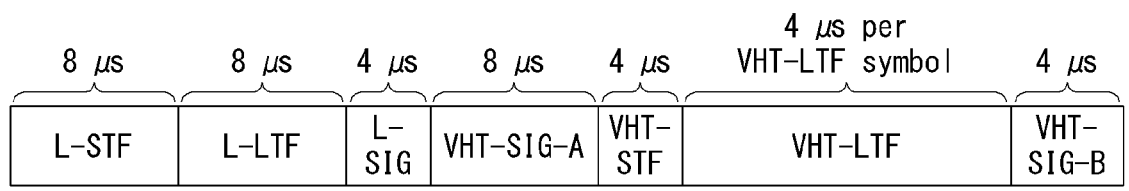
FIG. 9 illustrates an NDP PPDU in a wireless communication system to which the present invention may be applied.

FIG. 9 is a diagram illustrating an NDP PPDU in a wireless communication system to which the present invention may be applied.

Referring to FIG. 9, an NDP may have the VHT PPDU format shown previously in FIG. 4, but without the data field. The NDP may be precoded based on a particular precoding matrix and transmitted to a target STA for sounding.

In the L-SIG field of the NDP, the length field indicating the length of a PSDU included in the data field is set to '0'.

In the VHT-SIG-A field of the NDP, the Group ID field indicating whether a transmission technique used for NDP transmission is MU-MIMO or SU-MIMO is set to a value indicating SU-MIMO transmission.

The data bits of the VHT-SIG-B field of the NDP are set to a fixed bit pattern for each bandwidth.

Upon receiving the NDP, the target STA for sounding performs channel estimation and acquires channel state information.

Figure 10:
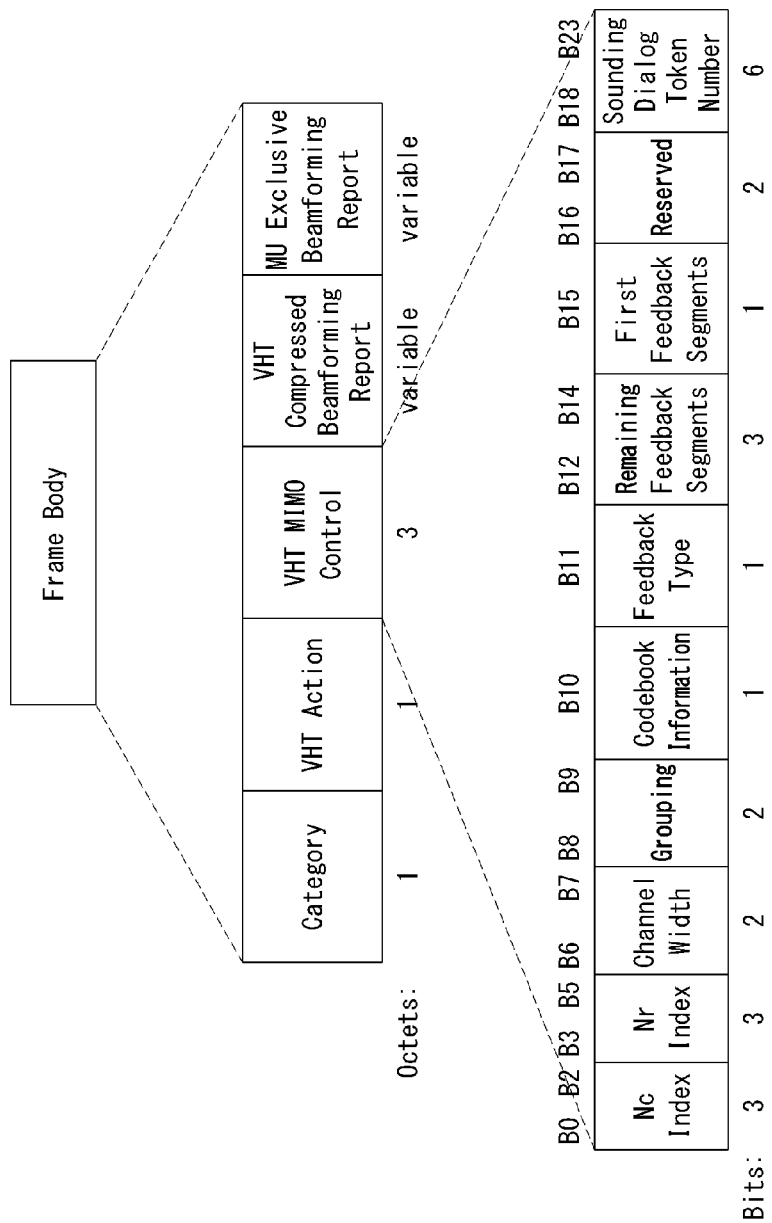
FIG. 10 illustrates a VHT compressed beamforming frame format in a wireless communication system to which the present invention may be applied.

FIG. 10 is a diagram illustrating a VHT compressed beamforming frame format in a wireless communication system to which the present invention may be applied.

Referring to FIG. 10, the VHT compressed beamforming frame is a VHT Action frame for supporting VHT functionality, and its frame body includes an Action field. The Action field is included in the frame body of a MAC frame to provide a mechanism for specifying extended management actions.

The Action field consists of a Category field, a VHT Action field, a VHT MIMO Control field, a VHT Compressed Beamforming Report field, and an MU Exclusive Beamforming Report field.

The Category field is set to a value indicating the VHT category (i.e., VHT Action frame), and the VHT Action field is set to a value indicating the VHT Compressed Beamforming frame.

The VHT MIMO Control field is used to feed back control information related to beamforming feedback. The VHT MIMO Control field may always be present in the VHT Compressed Beamforming frame.

The VHT Compressed Beamforming Report field is used to feed back information on a beamforming matrix containing SNR information for space-time streams used for transmitting data.

The MU Exclusive Beamforming Report field is used to feed back SNR information for spatial streams when performing a MU-MIMO transmission.

The presence and content of the VHT Compressed Beamforming Report field and the MU Exclusive Beamforming Report field are dependent on the values of the Feedback Type, Remaining Feedback Segments, and First Feedback Segment subfields of the VHT MIMO Control field Hereinafter, the VHT MIMO Control field, the VHT Compressed Beamforming Report field, and the MU Exclusive Beamforming Report field may be discussed more concretely.

1) The VHT MIMO Control field consists of an Nc index subfield, an Nr Index subfield, a Channel Width subfield, a Grouping subfield, a Codebook Information subfield, a Feedback type subfield, a Remaining Feedback segments subfield, a First Feedback segment subfield, a reserved subfield, and a Sounding Dialog Token Number field.

Table 5 shows the subfields of the VHT MIMO Control field.

TABLE 5

| Subfield | Bits | Description |
|---|---|---|
| Nc Index | 3 | Indicates the number of columns, Nc, in the compressed beamforming feedback matrix minus 1:<br>Set to 0 for Nc = 1,<br>Set to 1 for Nc = 2,<br>. . .<br>Set to 7 for Nc = 8. |
| Nr Index | 3 | Indicates the number of rows, Nr, in the compressed beamforming feedback matrix minus 1:<br>Set to 0 for Nr = 1,<br>Set to 1 for Nr = 2,<br>. . .<br>Set to 7 for Nr = 8. |
| Channel Width | 2 | Indicates the width of the channel measured to create a compressed beamforming feedback matrix:<br>Set to 0 for 20 MHz,<br>Set to 1 for 40 MHz,<br>Set to 2 for 80 MHz,<br>Set to 3 for 160 MHz or 80 + 80 MHz. |
| Grouping | 2 | Indicates the subcarrier grouping, Ng, used for the compressed beamforming feedback matrix:<br>Set to 0 for Ng = 1 (No grouping),<br>Set to 1 for Ng = 2,<br>Set to 2 for Ng = 4,<br>The value 3 is reserved. |
| Codebook Information | 1 | Indicates the size of codebook entries:<br>If Feedback Type is SU:<br>Set to 0 for b$\Psi$ = 2 and b$\Phi$ = 4,<br>Set to 1 for b$\Psi$ = 4 and b$\Phi$ = 6.<br>If Feedback Type is MU:<br>Set to 0 for b$\Psi$ = 5 and b$\Phi$ = 7<br>Set to 1 for b$\Psi$ = 7 and b$\Phi$ = 9.<br>Here, b$\Psi$ and b$\Phi$ indicate the number of quantization bits. |
| Feedback Type | 1 | Indicates the feedback type:<br>Set to 0 for SU-MIMO,<br>Set to 1 for MU-MIMO. |
| Remaining Feedback Segments | 3 | Indicates the number of remaining feedback segments for the associated VHT Compressed Beamforming frame:<br>Set to 0 for the last feedback segment of a segmented report or the only feedback segment of an unsegmented report.<br>Set to a value between 1 and 6 for a feedback segment that is neither the first nor the last of a segmented report.<br>Set to a value between 1 and 6 for a feedback segment that is not the last feedback segment of a segmented report.<br>In a retransmitted feedback segment, the field is set to the same value as the associated feedback segment in the original transmission. |
| First Feedback Segment | 1 | Set to 1 for the first feedback segment of a segmented report or the only feedback segment of an unsegmented report;<br>Set to 0 if it is not the first feedback segment or if the VHT Compressed Beamforming Report field and MU Exclusive Beamforming Report field are not present in the frame. |

TABLE 5-continued

| Subfield | Bits | Description |
|---|---|---|
| | | In a retransmitted feedback segment, the field is set to the same value as the associated feedback segment in the original transmission. |
| Sounding Dialog Token Number | 6 | Set to the value of the sounding dialog token of the NDPA frame. |

In a VHT Compressed Beamforming frame not carrying all or part of the VHT Compressed Beamforming Report field, the Nc Index subfield, Nr Index subfield, Channel Width subfield, Grouping subfield, Codebook Information subfield, Feedback Type subfield, and Sounding Dialog Token Number field are reserved, the First Feedback Segment field is set to 0, and the Remaining Feedback Segments field is set to 7.

The Sounding Dialog Token Number field also may be called a Sounding Sequence Number subfield.

2) The VHT Compressed Beamforming Report field is used to carry explicit feedback information in the form of angles representing compressed beamforming feedback matrices V for use by a transmit beamformer to determine steering matrices Q.

Table 6 shows the subfields of the VHT Compressed Beamforming Report field.

TABLE 6

| Subfield | Bits | Description |
|---|---|---|
| Average SNR of Space-Time Stream 1 | 8 | Signal-to-noise ratio at the beamformee for space-time stream 1 averaged over all subcarriers |
| . . . | . . . | . . . |
| Average SNR of Space-Time Stream Nc | 8 | Signal-to-noise ratio at the beamformee for space-time stream Nc averaged over all subcarriers |
| Compressed Beamforming Feedback Matrix V for subcarrier k = scidx(0) | Na × (bΨ + bΦ)/2 | Order of angles in the Compressed Beamforming feedback matrix for the corresponding subcarrier |
| Compressed Beamforming Feedback Matrix V for subcarrier k = scidx(1) | Na × (bΨ + bΦ)/2 | Order of angles in the Compressed Beamforming feedback matrix for the corresponding subcarrier |
| . . . | . . . | . . . |
| Compressed Beamforming Feedback Matrix V for subcarrier k = scidx(Ns − 1) | Na × (bΨ + bΦ)/2 | Order of angles in the Compressed Beamforming feedback matrix for the corresponding subcarrier |

With reference to Table 6, the VHT compressed beamforming report field may include the average SNR of each space-time stream and a Compressed Beamforming Feedback Matrix V for each subcarrier. The Compressed Beamforming Feedback Matrix is a matrix including information about channel state and can be used to calculate a channel matrix (i.e., steering matrix Q) for an MIMO-based transmission method.

scidx( ) refers to subcarriers which transmit the Compressed Beamfoming Feedback Matrix subfield. Na is fixed by the Nr×Nc value (e.g., Φ11, Ψ21, . . . for Nr×Nc=2×1).

Ns refers to the number of subcarriers which transmit a compressed beamforming feedback matrix to the beamformer. A beamformee, by using a grouping method, can reduce the number of subcarriers Ns which transmit the compressed beamforming feedback matrix. For example, the number of beamforming feedback matrices provided as feedback information can be reduced by grouping a plurality of subcarriers into one group and transmitting a compressed beamforming feedback matrix for the corresponding group. Ns may be calculated from the Channel Width and Grouping subfields in the VHT MIMO Control field.

Table 7 illustrates the average SNR of Space-Time Stream subfield.

TABLE 7

| Average SNR of Space-Time i subfield | AvgSNR_i |
|---|---|
| −128 | ≤10 dB |
| −127 | −9.75 dB |
| −126 | −9.5 dB |
| . . . | . . . |
| +126 | 53.5 dB |
| +127 | ≥53.75 dB |

With reference to Table 7, an average SNR for each stream-space stream is obtained by calculating the average SNR of all subcarriers in the corresponding channel and mapping the calculated average SNR into the range of −128 to +128.

3) The MU Exclusive Beamforming Report field is used to carry explicit feedback information in the form of delta ( ) SNRs. The information in the VHT Compressed Beamforming Report field and the MU Exclusive Beamforming Report field can be used by an MU beamformer to determine steering matrices Q.

Table 8 shows the subfields of the MU Exclusive Beamforming Report field included in a VHT compressed beamforming frame.

TABLE 8

| Subfield | Bits | Description |
| --- | --- | --- |
| Delta SNR for space-time stream 1 for subcarrier k = sscidx(0) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(0) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(1) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(1) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(Ns' − 1) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(Ns' − 1) | 4 | The deviation between the SNR of the corresponding subcarrier and the average SNR of all subcarriers for the corresponding space-time stream. |

With reference to Table 8, the MU Exclusive Beamforming Report field may include an SNR for each space-time stream for each subcarrier.

Each Delta SNR subfield has a value which is in the range of −8 dB to 7 dB in 1 dB increments.

scidx( ) refers to subcarrier(s) which transmit the Delta SNR subfield. Ns refers to the number of subcarriers which transmit the Delta SNR subfield to the beamformer.

FIG. 11 is a diagram illustrating a Beamforming Report Poll frame format in a wireless communication system to which the present invention may be applied.

Referring to FIG. 11, the Beamforming Report Poll frame consists of a Frame Control field, a Duration field, an RA (Receiving Address) field, a TA (Transmitting Address) field, a Feedback Segment Retransmission Bitmap field, and an FCS.

The RA field value is the address of the intended recipient.

The TA field value is the address of the STA transmitting the Beamforming Report Poll or a bandwidth signaling TA.

The Feedback Segment Retransmission Bitmap field indicates the requested feedback segments of a VHT Compressed Beamforming report.

If the bit in position n (n=0 for LSB and n=7 for MSB) is 1, then the feedback segment with the Remaining Feedback Segments subfield in the VHT MIMO Control field equal to n is requested. If the bit in position n is 0, then the feedback segment with the Remaining Feedback Segments subfield in the VHT MIMO Control field equal to n is not requested.

Downlink (DL) MU-MIMO Frame

Figure 12:
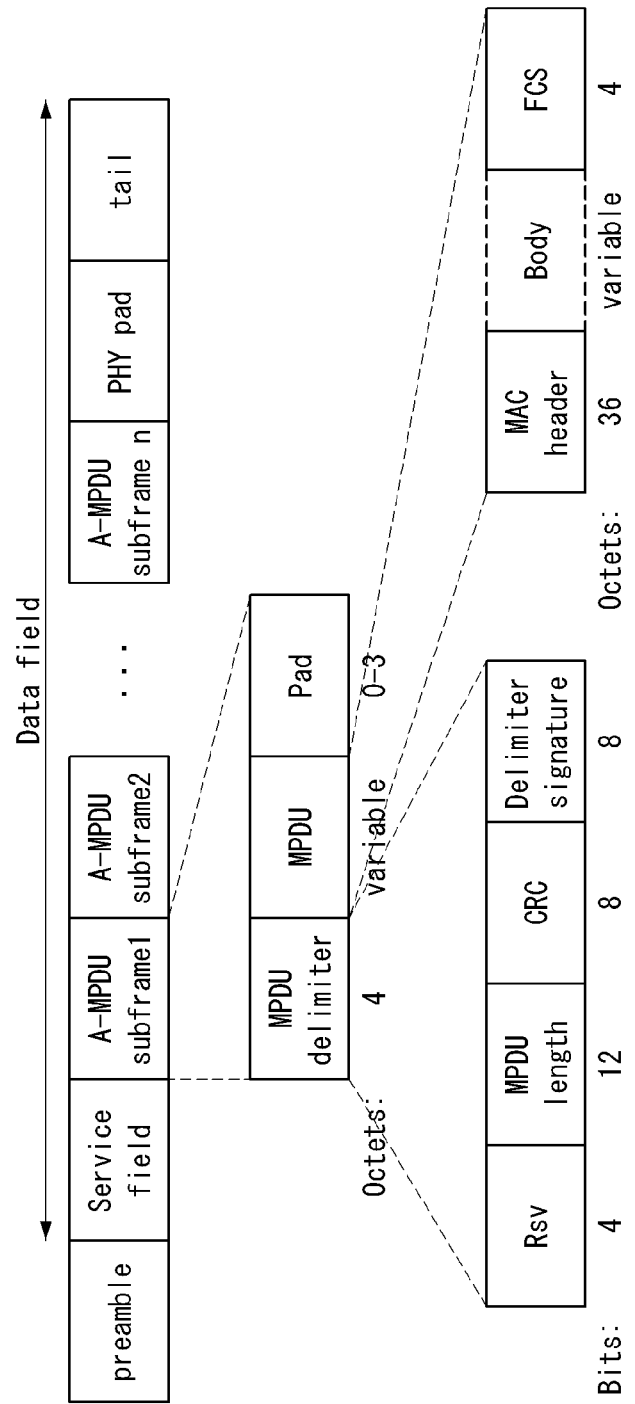
FIG. 12 illustrates a downlink multi-user PPDU format in a wireless communication system to which the present invention may be applied.

FIG. 12 is a diagram illustrating a DL multi-user (MU) PPDU format in a wireless communication system to which an embodiment of the present invention may be applied.

Referring to FIG. 12, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

Figure 13:
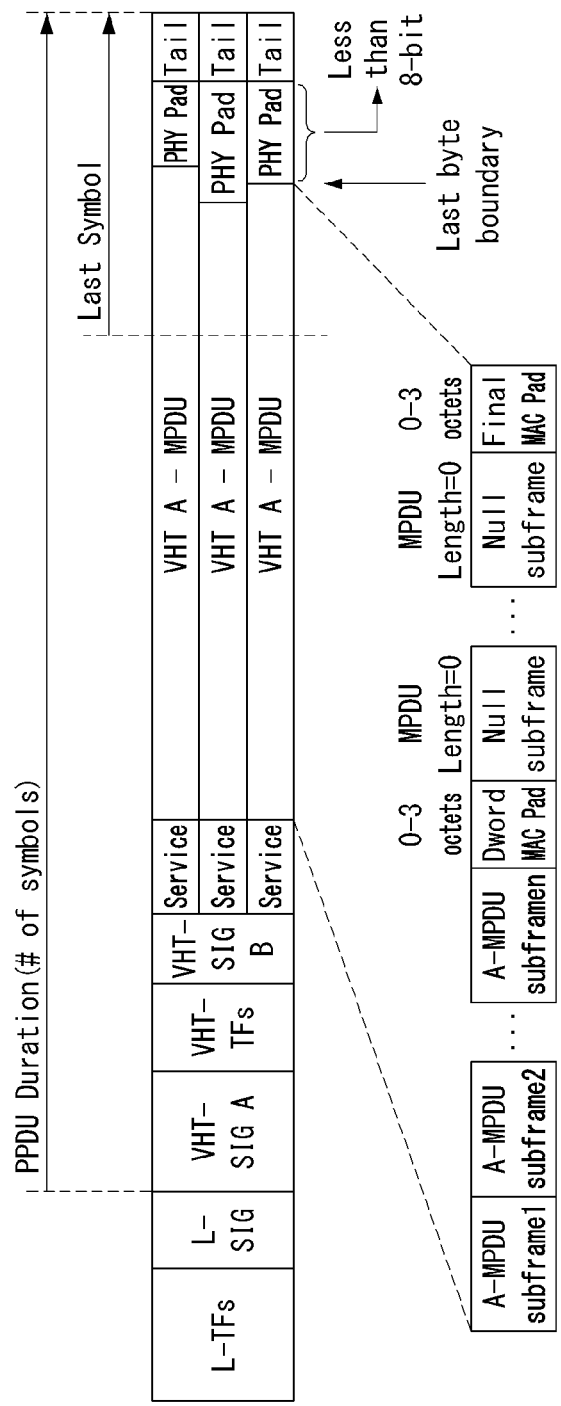
FIG. 13 illustrates a downlink multi-user PPDU format in a wireless communication system to which the present invention may be applied.

FIG. 13 is a diagram illustrating a DL multi-user (MU) PPDU format in a wireless communication system to which an embodiment of the present invention may be applied.

In FIG. 13, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 13, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 13, each VHT A-MPDU may be transmitted in a different stream.

In FIG. 13, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block Ack Procedure

Figure 14:
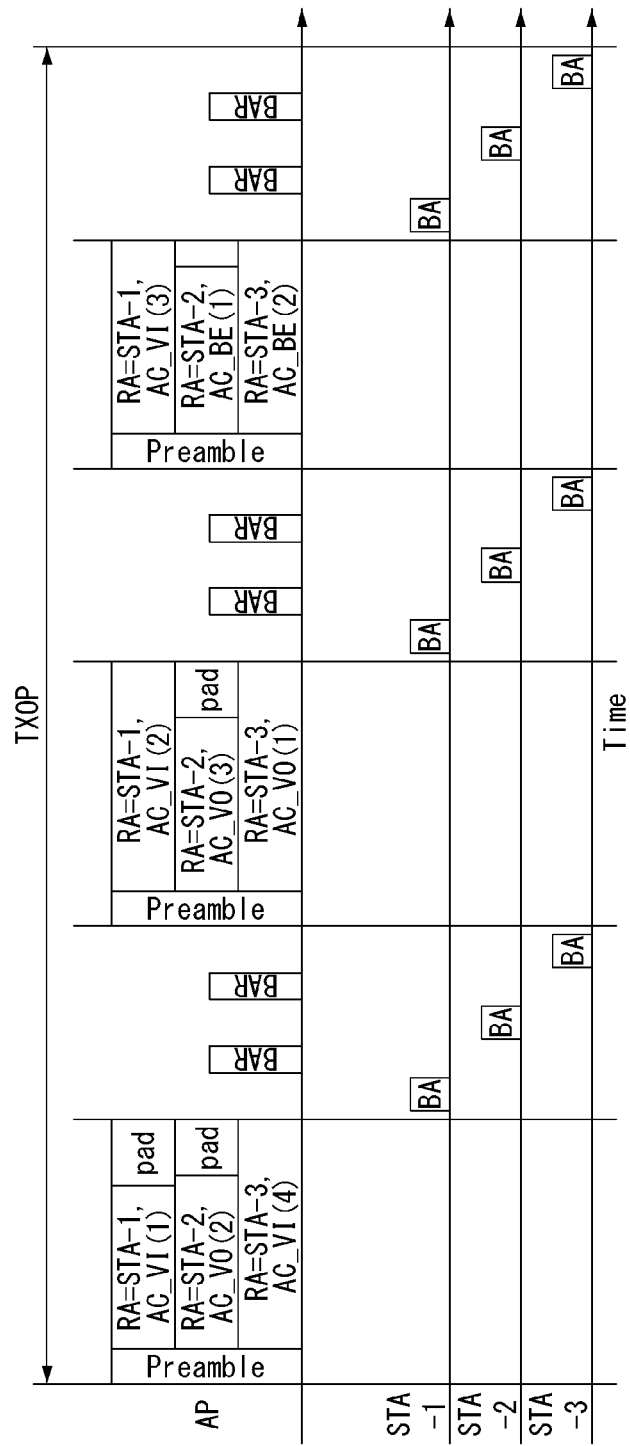
FIG. 14 illustrates a downlink MU-MIMO transmission process in a wireless communication system to which the present invention may be applied.

FIG. 14 is a diagram illustrating a downlink MU-MIMO transmission process in a wireless communication system to which the present invention may be applied.

MI-MIMO in 802.11ac works only in the downlink direction from the AP to clients. A multi-user frame can be transmitted to multiple receivers at the same time, but the acknowledgements must be transmitted individually in the uplink direction.

Every MPDU transmitted in a VHT MU PPDU based on 802.11ac is included in an A-MPDU, so responses to A-MPDUs within the VHT MU PPDU that are not immediate responses to the VHT MU PPDU are transmitted in response to BAR (Block Ack Request) frames by the AP.

To begin with, the AP transmits a VHT MU PPDU (i.e., a preamble and data) to every receiver (i.e., STA 1, STA 2, and STA 3). The VHT MU PPDU includes VHT A-MPDUs that are to be transmitted to each STA.

Having received the VHT MU PPDU from the AP, STA 1 transmits a BA (Block Acknowledgement) frame to the AP after an SIFS. A more detailed description of the BA frame will be described later.

Having received the BA from STA 1, the AP transmits a BAR (block acknowledgement request) frame to STA 2 after an SIFS, and STA 2 transmits a BA frame to the AP after an SIFS. Having received the BA frame from STA 2, the AP transmits a BAR frame to STA 3 after an SIFS, and STA 3 transmits a BA frame to the AP after an SIFS.

When this process is performed all STAs, the AP transmits the next MU PPDU to all the STAs.

ACK (Acknowledgement)/Block ACK Frames

In general, an ACK frame is used as a response to an MPDU, and a block ACK frame is used as a response to an A-MPDU.

Figure 15:
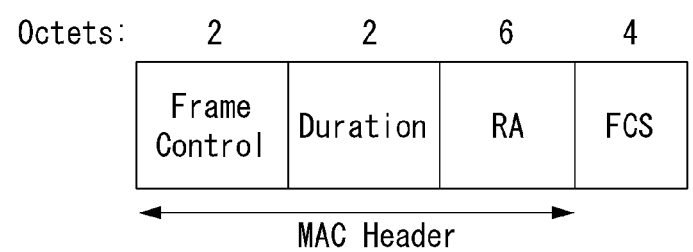
FIG. 15 illustrates an ACK frame in a wireless communication system to which the present invention may be applied.

FIG. 15 is a diagram illustrating an ACK frame in a wireless communication system to which the present invention may be applied.

Referring to FIG. 15, the ACK frame consists of a Frame Control field, a Duration field, an RA field, and a FCS.

The RA field is set to the value of the Address 2 field of the immediately preceding Data frame, Management frame, Block Ack Request frame, Block Ack frame, or PS-Poll frame.

For ACK frames sent by non-QoS STAs, if the More Fragments subfield is set to 0 in the Frame Control field of the immediately preceding Data or Management frame, the duration value is set to 0.

For ACK frames not sent by non-QoS STAs, the duration value is set to the value obtained from the Duration/ID field of the immediately preceding Data, Management, PS-Poll, BlockAckReq, or BlockAck frame minus the time, in microseconds, required to transmit the ACK frame and its SIFS interval. If the calculated duration includes a fractional microsecond, that value is rounded up to the next higher integer.

Hereinafter, the Block Ack Request frame will be discussed.

Figure 16:
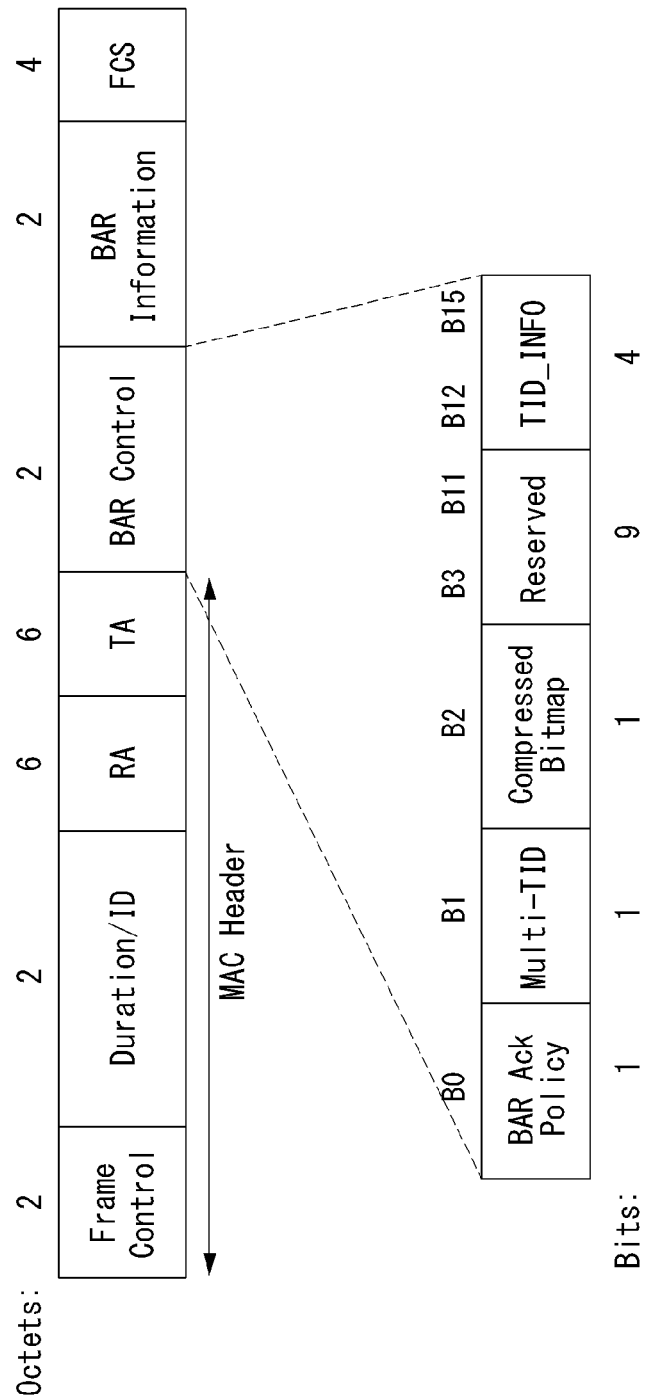
FIG. 16 illustrates a block ACK request frame in a wireless communication system to which the present invention may be applied.

FIG. 16 is a diagram illustrating a Block Ack Request frame in a wireless communication system to which the present invention may be applied.

Referring to FIG. 16, the Block Ack Request frame consists of a Frame Control field, a Duration/ID field, an RA field, a TA field, a BAR Control field, a BAR Information field, and a frame check sequence (FCS).

The RA field may be set to the address of the STA receiving the BAR frame.

The TA field may be set to the address of the STA transmitting the BAR frame.

The BAR Control field includes a BAR Ack Policy subfield, a Multi-TID subfield, a Compressed Bitmap subfield, a Reserved subfield, and a TID_Info subfield.

Table 9 shows the BAR Control field.

TABLE 9

| Subfield | Bits | Description |
|---|---|---|
| BAR Ack Policy | 1 | Set to 0 when the sender requires immediate ACK of a data transmission.<br>Set to 1 when the sender does not require immediate ACK of a data transmission. |
| Multi-TID | 1 | Indicates the type of the BAR frame depending on the values of the Multi-TID subfield and Compressed Bitmap subfield.<br>00: Basic BAR<br>01: Compressed BAR<br>10: Reserved<br>11: Multi-TID BAR |
| Compressed Bitmap | 1 | |
| Reserved | 9 | |
| TID_Info | 4 | The meaning of the TID_Info field depends on the type of the BAR frame.<br>For a Basic BAR frame and a Compressed BAR frame, this subfield contains information on TIDs for which a BA frame is required.<br>For a Multi-TID BAR frame, this subfield contains the number of TIDs. |

The BAR Information field contains different information depending on the type of the BAR frame. This will be described with reference to FIG. 17.

Figure 17:
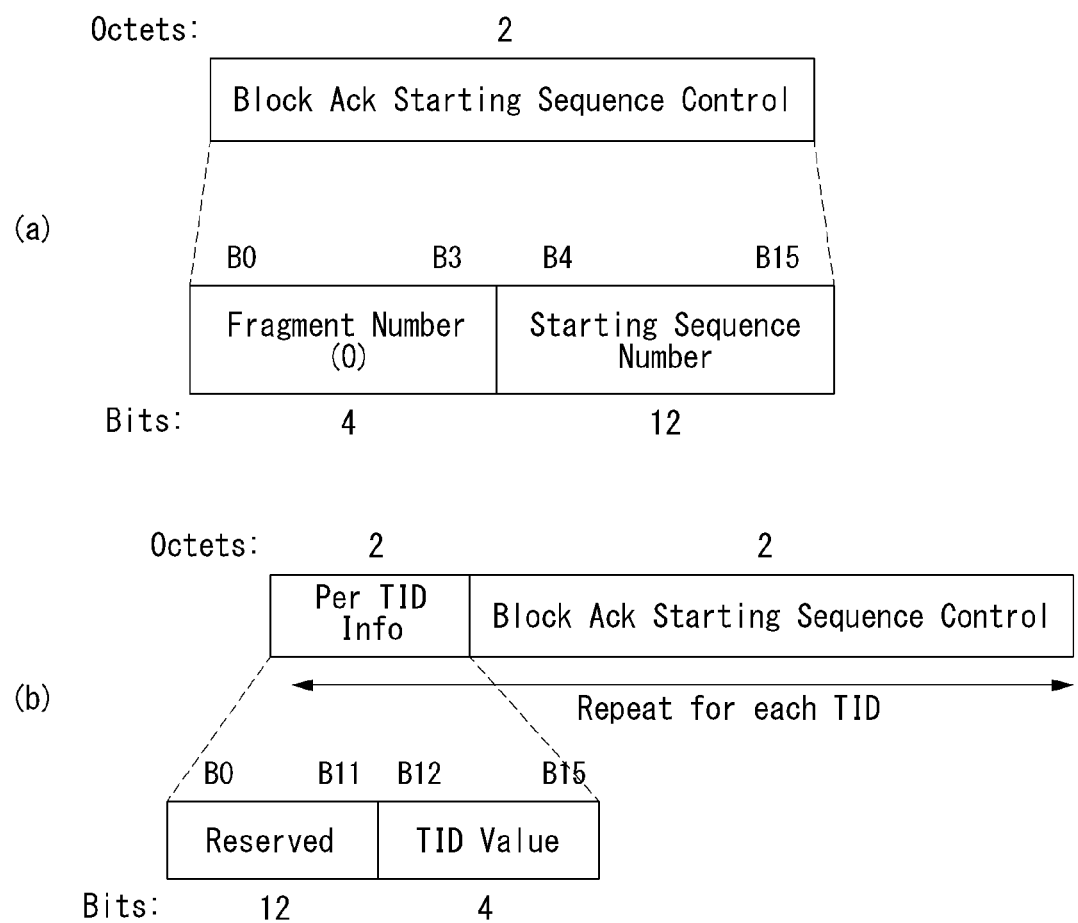
FIG. 17 illustrates a BAR information field of a block ACK request frame in a wireless communication system to which the present invention may be applied.

FIG. 17 is a diagram illustrating the BAR Information field of a Block Ack Request frame in a wireless communication system to which the present invention may be applied.

(a) of FIG. 17 illustrates the BAR Information field of Basic BAR and Compressed BAR frames, and (b) of FIG. 17 illustrates the BAR Information field of a Multi-TID BAR frame.

Referring to (a) of FIG. 17, for the Basic BAR and Compressed BAR frames, the BAR Information field includes a Block Ack Starting Sequence Control subfield.

The Block Ack Starting Sequence Control subfield includes a Fragment Number subfield and a Starting Sequence Number subfield.

The Fragment Number subfield is set to 0.

For the Basic BAR frame, the Starting Sequence Number subfield contains the sequence number of the first MSDU for which the corresponding BAR frame is sent. For the Compressed BAR frame, the Starting Sequence Control subfield contains the sequence number of the first MSDU or A-MSDU for which the corresponding BAR frame is sent.

Referring to (b) of FIG. 17, for the Multi-TID BAR frame, the BAR Information field includes a Per TID Info subfield and a Block Ack Starting Sequence Control subfield, which are repeated for each TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BAR frame is sent.

Figure 18:
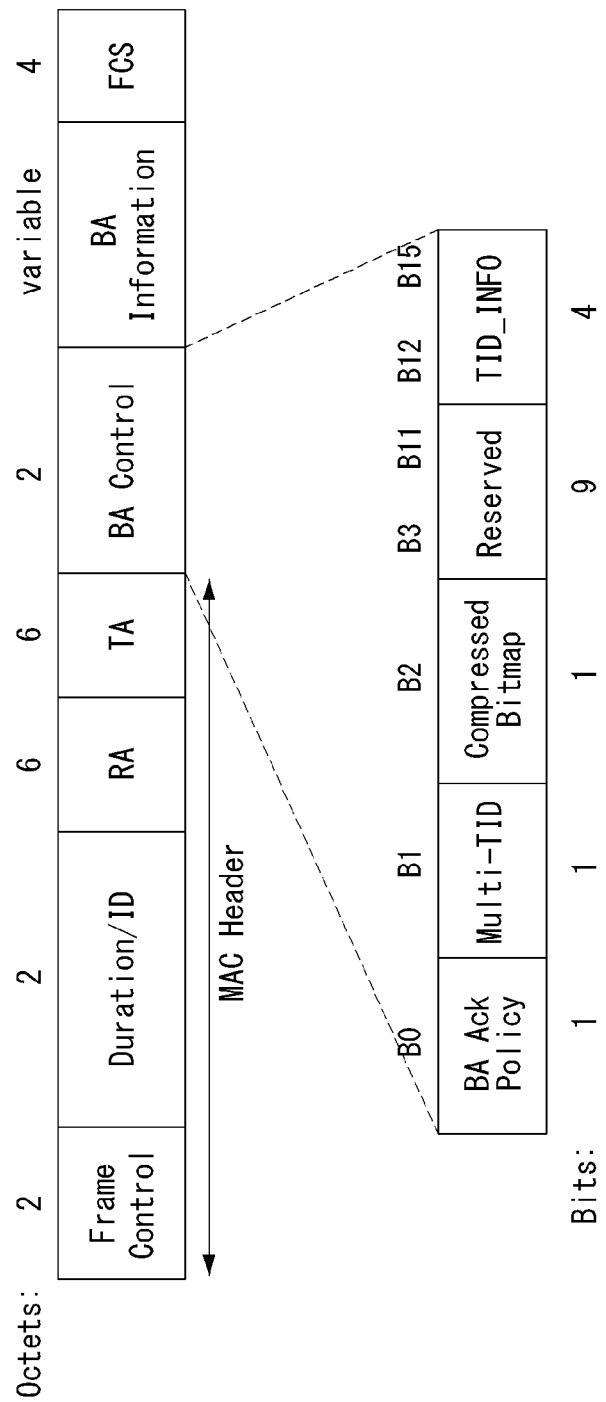
FIG. 18 illustrates a block ACK frame in a wireless communication system to which the present invention may be applied.

FIG. 18 is a diagram illustrating a Block Ack frame in a wireless communication system to which the present invention may be applied.

Referring to FIG. 18, the Block Ack (BA) frame consists of a Frame Control field, a Duration/ID field, an RA field, a TA field, a BA Control field, a BA Information field, and a Frame Check Sequence (FCS).

The RA field may be set to the address of the STA requesting the BA frame.

The TA field may be set to the address of the STA transmitting the BA frame.

The BA Control field includes a BA Ack Policy subfield, a Multi-TID subfield, a Compressed Bitmap subfield, a Reserved subfield, and a TID_Info subfield.

Table 10 shows the BA Control field.

TABLE 10

| Subfield | Bits | Description |
|---|---|---|
| BA Ack Policy | 1 | Set to 0 when the sender requires immediate ACK of a data transmission.<br>Set to 1 when the sender does not require immediate ACK of a data transmission. |
| Multi-TID | 1 | Indicates the type of the BA frame depending on the values of the Multi-TID subfield and Compressed Bitmap subfield.<br>00: Basic BA<br>01: Compressed BA<br>10: Reserved<br>11: Multi-TID BA |
| Compressed Bitmap | 1 | |

TABLE 10-continued

| Subfield | Bits | Description |
|---|---|---|
| Reserved | 9 | |
| TID_Info | 4 | The meaning of the TID_Info field depends on the type of the BA frame. For a Basic BA frame and a Compressed BA frame, this subfield contains information on TIDs for which a BA frame is required. For a Multi-TID BA frame, this subfield contains the number of TIDs. |

The BA Information field contains different information depending on the type of the BA frame. This will be described with reference to FIG. 19.

Figure 19:
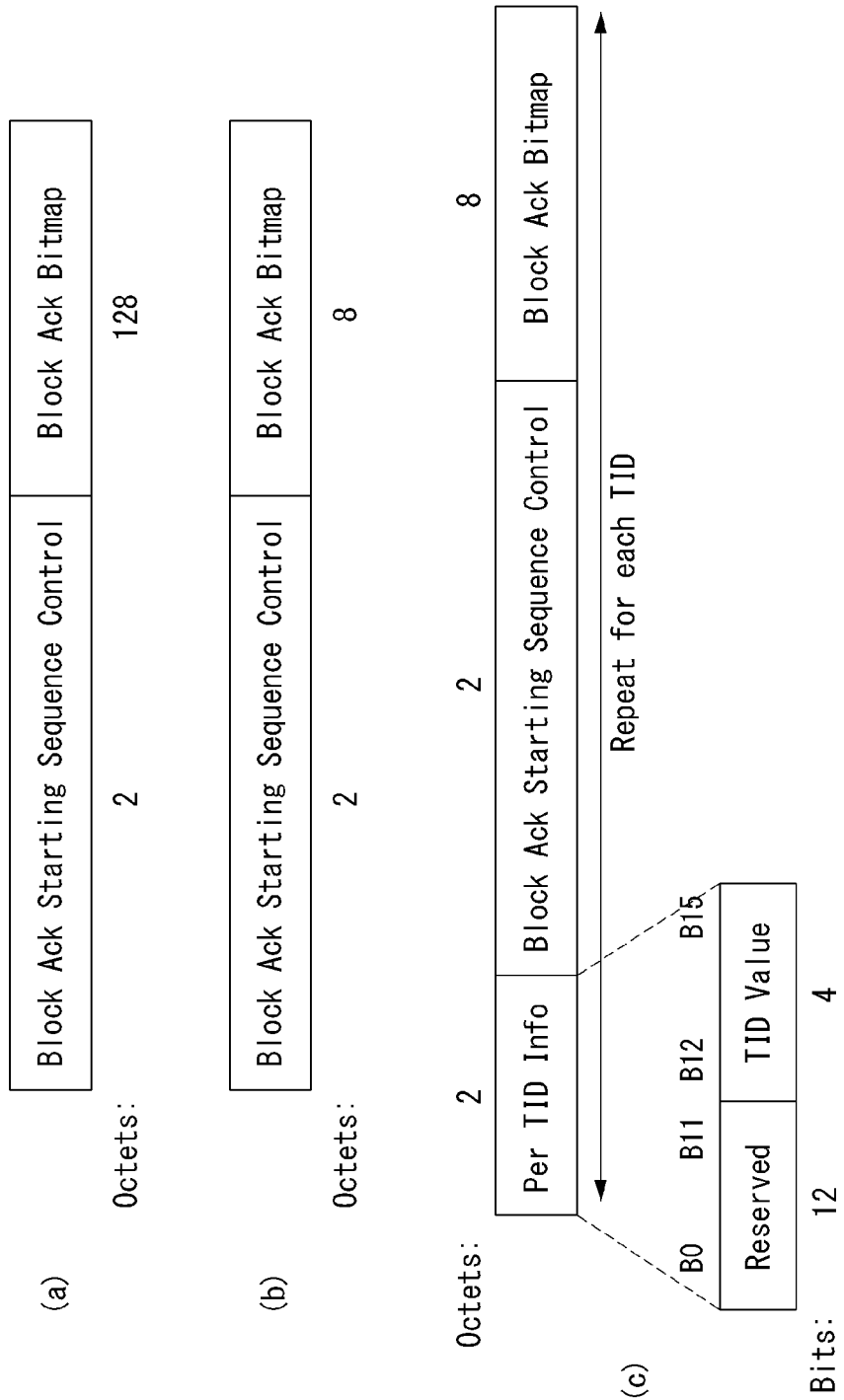
FIG. 19 illustrates a BA information field of a block ACK frame in a wireless communication system to which the present invention may be applied.

FIG. 19 is a diagram illustrating the BA Information field of a Block Ack frame in a wireless communication system to which the present invention may be applied.

(a) of FIG. 19 illustrates the BA Information field of a Basic BA frame, (b) of FIG. 19 illustrates the BA Information field of a Compressed BAR frame, and (c) of FIG. 19 illustrates the BA Information field of a Multi-TID BA frame.

Referring to (a) of FIG. 19, for the Basic BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU for which the corresponding BA frame is sent, and is set to the same value as the immediately preceding Basic BAR frame.

The Block Ack Bitmap subfield is 128 octets in length and is used to indicate the received status of a maximum of 64 MSDUs. If a bit of the Block Ack Bitmap subfield has a value of '1', it indicates the successful reception of a single MSDU corresponding to that bit position, and if a bit of the Block Ack Bitmap subfield has a value of '0', it indicates the unsuccessful reception of a single MSDU corresponding to that bit position.

Referring to (b) of FIG. 19, for the Compressed BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU or A-MSDU for which the corresponding BA frame is sent, and is set to the same value as the immediately preceding Basic BAR frame.

The Block Ack Bitmap subfield is 8 octets in length and is used to indicate the received status of a maximum of 64 MSDUs and A-MSDU. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

Referring to (c) of FIG. 19, for the Multi-TID BA frame, the BA Information field includes a Per TID Info subfield and a Block Ack Starting Sequence Control subfield, which are repeated for each TID in order of increasing TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BA frame is sent.

The Block Ack Bitmap subfield is 8 octets in length. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

Figure 20:
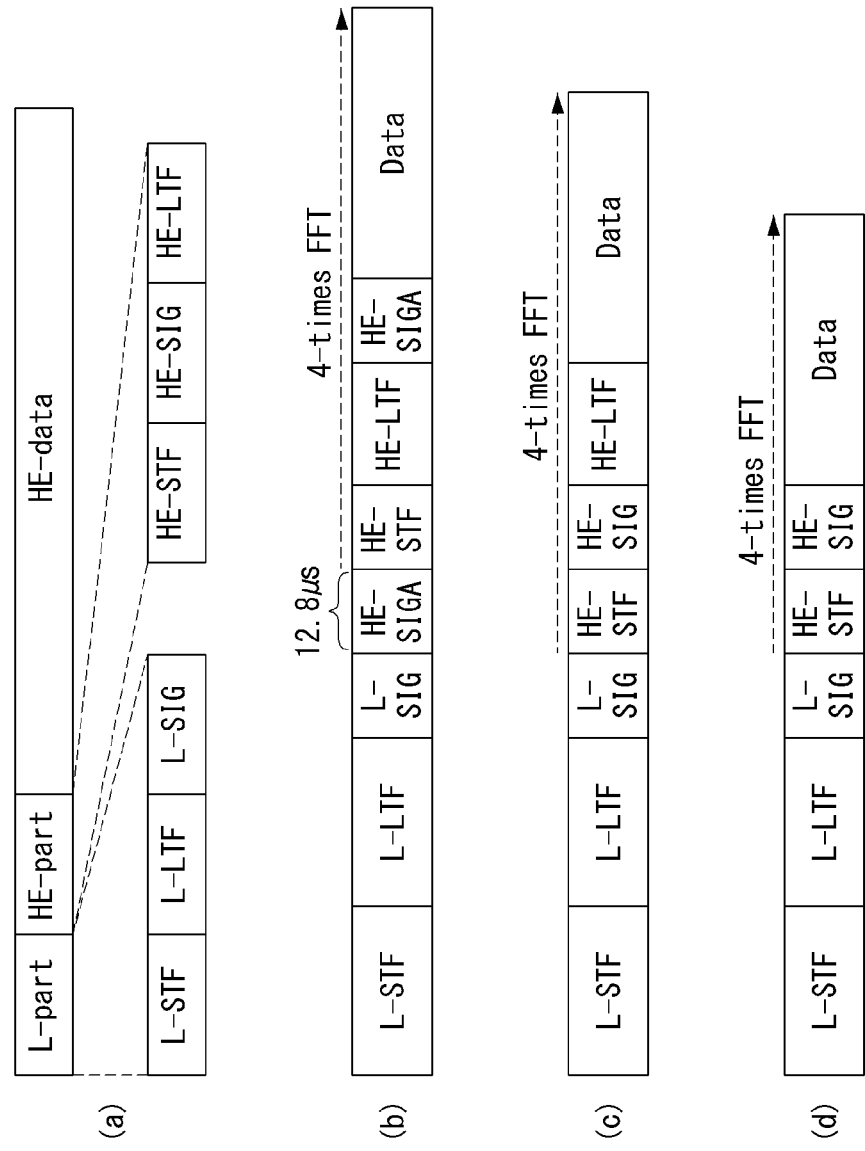
FIG. 20 illustrates an HE (High Efficiency) format PPDU according to one embodiment of the present invention.

FIG. 20 is a diagram illustrating a high efficiency (HE) format PPDU according to an embodiment of the present invention.

FIG. 20(a) illustrates a schematic configuration of the HE format PPDU, and FIGS. 20(b) to 20(d) illustrate more detailed configurations of the HE format PPDU.

Referring to FIG. 20(*a*), the HE format PPDU for an HEW may basically include a legacy part (L-part: legacy-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

Figure 25:
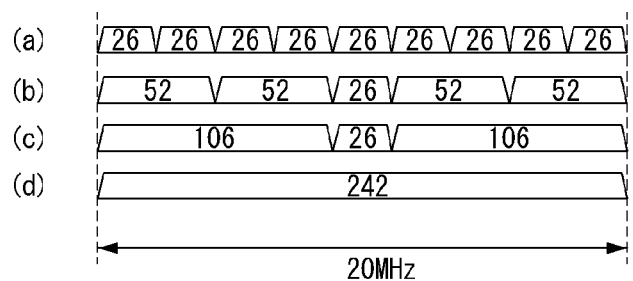
FIGS. 25 to 27 illustrate a resource allocation unit in an OFDMA multi-user transmission method according to one embodiment of the present invention.

The HE-part is a part newly defined for the 802.11ax standard and may include an HE-STF, a HE-SIG field, and an HE-LTF. In FIG. 25(*a*), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

Also, the L-part, HE-part (or HE-preamble) may be generally called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 20 (*b*), the HE-SIG field may be divided into a HE-SIG-A field and a HE-SIG-B field.

For example, the HE-part of the HE format PPDU may include a HE-SIG-A field having a length of 12.8 μs, an HE-STF of 1 OFDM symbol, one or more HE-LTFs, and a HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 20(*b*), the positions of the HE-SIG-A field and the HE-SIG-B field may be different from those of FIG. 25(*b*). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 20(*c*), the HE-SIG field may not be divided into a HE-SIG-A field and a HE-SIG-B field.

For example, the HE-part of the HE format PPDU may include an HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 20(*d*), the HE-SIG field is not divided into a HE-SIG-A field and a HE-SIG-B field, and the HE-LTF may be omitted.

For example, the HE-part of the HE format PPDU may include an HE-STF of 1 OFDM symbol and a HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for the WLAN system to which the present invention may be applied may be transmitted through at least one 20 MHz channel. For example, the HE format PPDU may be transmitted in the 40 MHz, 80 MHz or 160 MHz frequency band through total four 20 MHz channel. This will be described in more detail with reference to the drawing below.

FIG. 21 is a diagram illustrating a HE format PPDU according to an embodiment of the present invention.

FIG. 21 illustrates a PPDU format when 80 MHz is allocated to one STA (or OFDMA resource units are allocated to multiple STAs within 80 MHz) or when different streams of 80 MHz are allocated to multiple STAs, respectively.

Referring to FIG. 21, an L-STF, an L-LTF, and an L-SIG may be transmitted an OFDM symbol generated on the basis of 64 FFT points (or 64 subcarriers) in each 20 MHz channel.

Also, the HE-SIG B field may be positioned after the HE-SIG A field. In this case, an FFT size per unit frequency may be further increased after the HE-SFT (or HE-SIG B). For example, from the HE-STF (or HE-SIG-B), 256 FFTs may be used in the 20 MHz channel, 512 FFTs may be used in the 40 MHz channel, and 1024 FFTs may be used in the 80 MHz channel.

A HE-SIG-A field may include common control information commonly received by STAs which receive a PPDU.

The HE-SIG-A field may be transmitted in 1 to 3 OFDM symbols. The HE-SIG-A field is duplicated for each 20 MHz and contains the same information. Also, the HE-SIG-A field indicates full bandwidth information of the system.

Table 11 illustrates information contained in the HE-SIG-A field.

TABLE 11

| Field | Bits | Description |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 11 may be as defined in the IEEE 802.11 system. Also, the above-described fields are examples of the fields that may be included in the PPDU but not limited to them. That is, the above-described fields may be substituted with other fields or further include additional fields, and not all of the fields may be necessarily included. Another example of information included in the HE-SIG A field will be described hereinafter in relation to FIG. 34.

The HE-STF field is used to improve AGC estimation in MIMO transmission.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF, L-LTF, and L-SIG fields are transmitted through 64 FFT in a 20 MHz channel so that they can be received by a legacy STA. For example, the L-SIG field may occupy a single OFDM symbol, a single OFDM symbol time may be 4 µs, and a GI may be 0.8 µs.

An FFT size per unit frequency may be further increased from the HE-STF (or from the HE-SIG-A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 22 is a drawing illustrating an HE format PPDU according to an embodiment of the present invention.

In FIG. 22, it is assumed that 20 MHz channels are allocated to different STAs (e.g., STA 1, STA 2, STA 3, and STA 4).

Referring to FIG. 22, an FFT size per unit frequency may be further increased from the HE-SFT (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in a PPDU is the same as the example of FIG. 26, and thus, descriptions thereof will be omitted hereinafter.

The HE-SIG-B may include information specified to each STA but it may be encoded in the entire band (i.e., indicated in the HE-SIG-A field). That is, the HE-SIG-B field includes information regarding every STA and every STA receives the HE-SIG-B field.

The HE-SIG-B field may provide frequency bandwidth information allocated to each STA and/or stream information in a corresponding frequency band. For example, in FIG. 27, as for the HE-SIG-B, STA 1 may be allocated 20 MHz, STA 2 may be allocated a next 20 MHz, STA 3 may be allocated a next 20 MHz, and STA 4 may be allocated a next 20 MHz. Also, the STA 1 and STA 2 may be allocated 40 MHz and STA 3 and STA 4 may be allocated a next 40 MHz. In this case, STA 1 and STA 2 may be allocated different streams and STA 3 and STA 4 may be allocated different streams.

Figure 27:
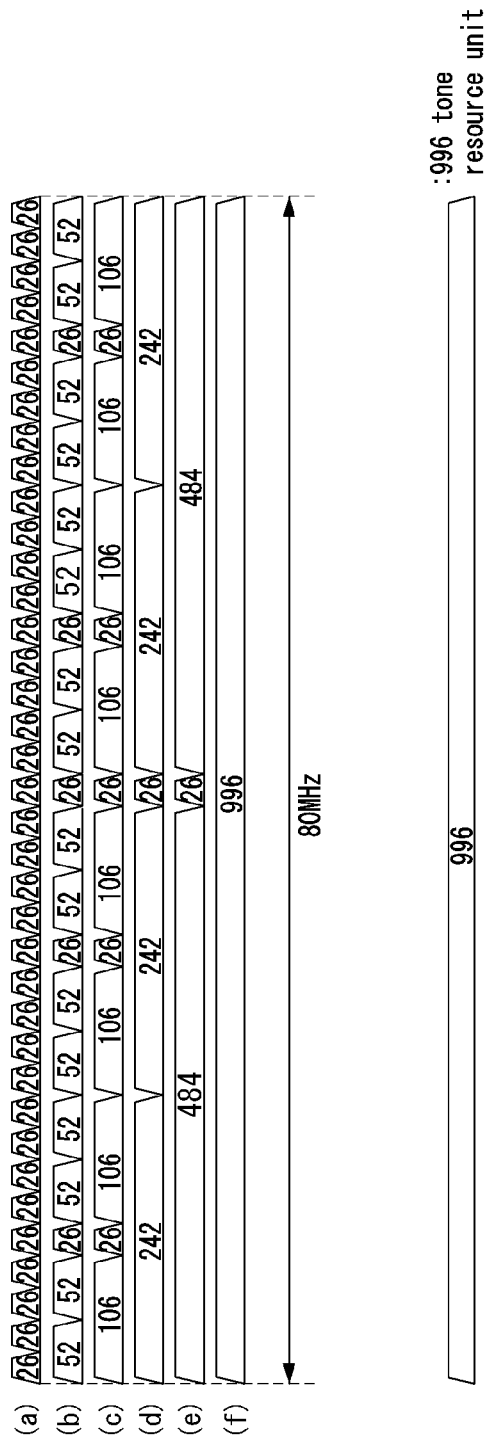

Also, an HE-SIG C field may be defined and added to the example of FIG. 27. Here, information regarding every STA may be transmitted in the entire band in the HE-SIG-B field, and control information specified to each STA may be transmitted by 20 MHz through the HE-SIG-C field.

Also, unlike the examples of FIGS. 21 and 22, the HE-SIG-B field may not be transmitted in the entire band but may be transmitted by 20 MHz, like the HE-SIG-A field. This will be described with reference to FIG. 26.

FIG. 23 is a diagram illustrating an HE format PPDU according to an embodiment of the present invention.

In FIG. 23, it is assumed that 20 MHz channels are allocated to different STAs (e.g., STA 1, STA 2, STA 3, and STA 4).

Referring to FIG. 23, the HE-SIG-B field is not transmitted in the entire band but is transmitted by 20 MHz, like the HE-SIG-A field. Here, however, unlike the HE-SIG-A field, the HE-SIG-B field may be encoded by 20 MHz and transmitted but may not be duplicated by 20 MHz and transmitted.

Here, an FFT size per unit frequency may be further increased from the HE-STF (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Figure 26:
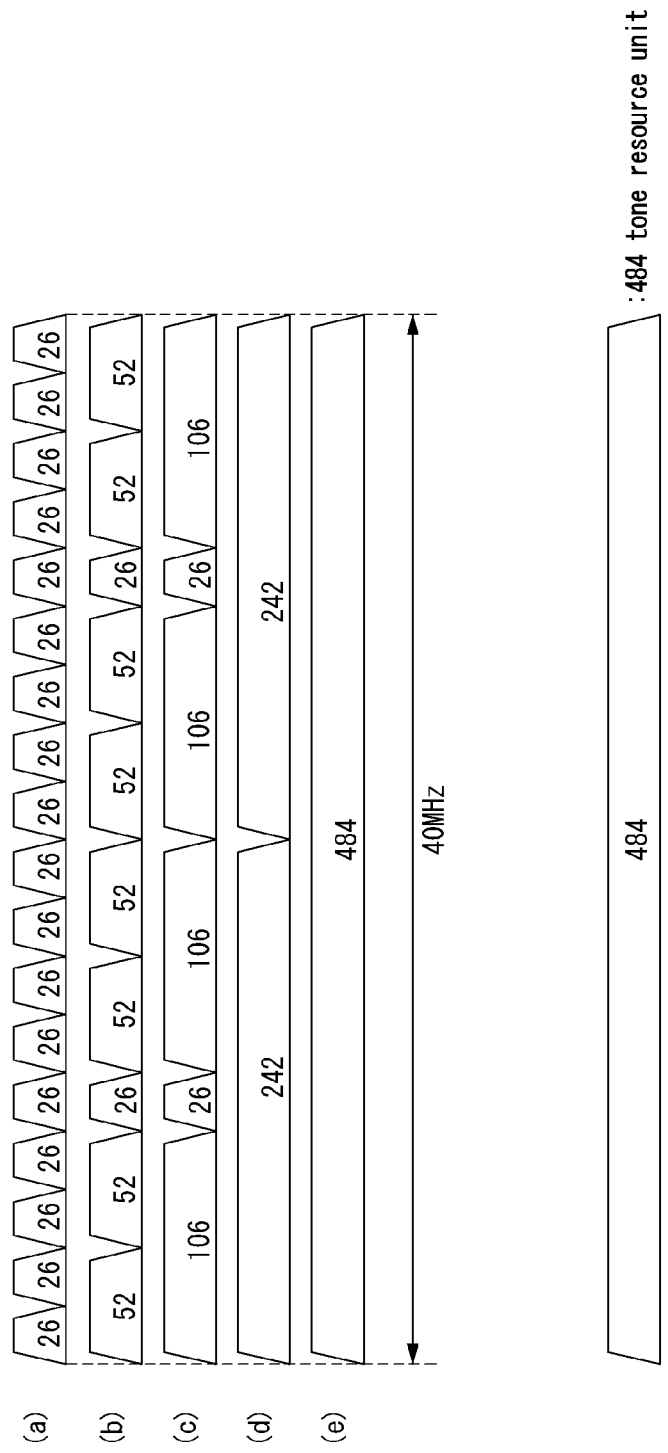

Information transmitted in each field included in the PPDU is the same as the example of FIG. 26, and thus, descriptions thereof will be omitted.

The HE-SIG-A field is duplicated by 20 MHz and transmitted.

The HE-SIG-B field may provide frequency bandwidth information allocated to each STA and/or stream information in a corresponding frequency band. Since the HE-SIG-B field includes information regarding each STA, information regarding each STA may be included in each HE-SIG-B field in units of 20 MHz. Here, in the example of FIG. 23, 20 MHz is allocated to each STA, but, in a case in which 40 MHz is allocated to an STA, the HE-SIG-B may be duplicated by 20 MHz and transmitted.

In a case where a partial bandwidth having a low level of interference from an adjacent BSS is allocated to an STA in a situation in which each BSS supports different bandwidths, the HE-SIG-B is preferably not transmitted in the entire band as mentioned above.

Hereinafter, the HE format PPDU of FIG. 28 will be described for the purposes of description.

In FIGS. 21 to 23, a data field, as payload, may include a service field, a scrambled PSDU, a tail bit, and a padding bit.

Meanwhile, the HE format PPDU illustrated in FIGS. 21 to 23 may be distinguished through a repeated L-SIG (RL-SIG), a repeated symbol of an L-SIG field. The RL-SIG field is inserted in front of the HE SIG-A field, and each STA may identify a format of a received PPDU using the RL-SIG field, as an HE format PPDU.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

Figure 24:
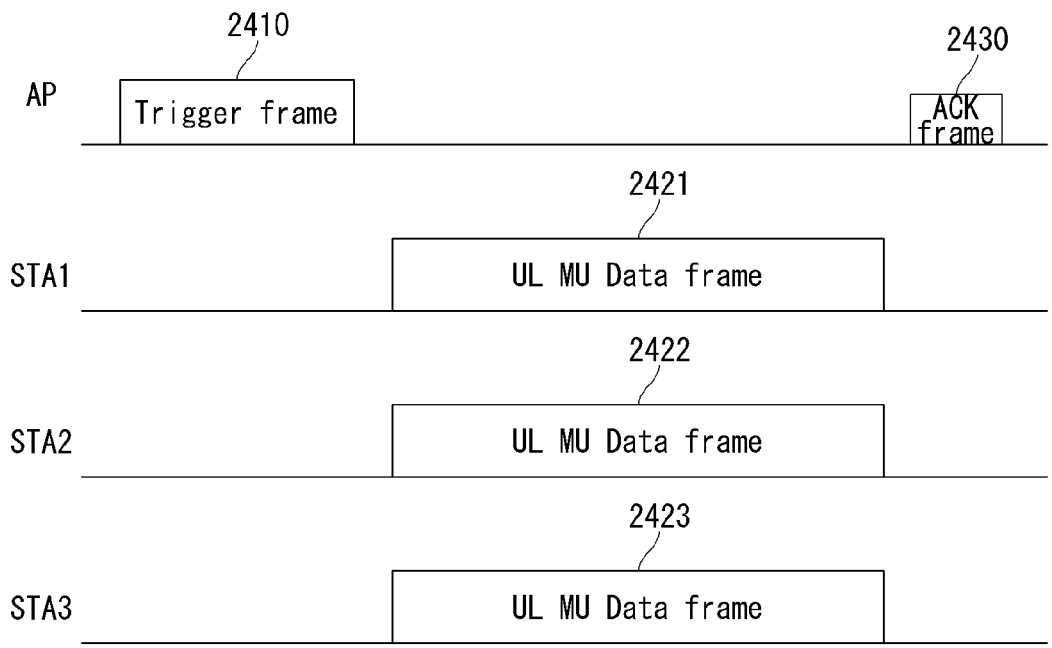
FIG. 24 illustrates an uplink multi-user transmission procedure according to one embodiment of the present invention.

FIG. 24 is a diagram illustrating an uplink multi-user transmission procedure according to an embodiment of the present invention.

Referring to FIG. 24, an AP may instruct STAs participating in UL MU transmission to prepare for UL MU transmission, receive an UL MU data frame from these STAs, and send an ACK frame (BA (Block Ack) frame) in response to the UL MU data frame.

First of all, the AP instructs STAs that will transmit UL MU data to prepare for UL MU transmission by sending an UL MU Trigger frame 2410. Here, the term UL MU scheduling frame may be called "UL MU scheduling frame".

Here, the UL MU Trigger frame 2410 may contain control information such as STA ID (identifier)/address information, information on the allocation of resources to be used by each STA, and duration information.

The STA ID/address information refers to information on the identifier or address for specifying an STA that transmits uplink data.

The resource allocation information refers to information on uplink transmission resources allocated to each STA (e.g., information on frequency/subcarriers allocated to each STA in the case of UL MU OFDMA transmission and a stream index allocated to each STA in the case of UL MU MIMO transmission).

The duration information refers to information for determining time resources for transmitting an uplink data frame sent by each of multiple STAs.

For example, the duration information may include period information of a TXOP (Transmit Opportunity) allocated for uplink transmission of each STA or information (e.g., bits or symbols) on the uplink frame length.

Also, the UL MU Trigger frame 2410 may further include control information such as information on an MCS to be used when each STA sends an UL MU data frame, coding information, etc.

The above-mentioned control information may be transmitted in a HE-part (e.g., the HE-SIG-A field or HE-SIG-B field) of a PPDU for delivering the UL MU Trigger frame 2410 or in the control field of the UL MU Trigger frame 2410 (e.g., the Frame Control field of the MAC frame).

The PPDU for delivering the UL MU Trigger frame 2410 starts with an L-part (e.g., the L-STF field, L-LTF field, and L-SIG field). Accordingly, legacy STAs may set their NAV (Network Allocation Vector) by L-SIG protection through the L-SIG field. For example, in the L-SIG, legacy STAs may calculate a period for NAV setting (hereinafter, 'L-SIG protection period') based on the data length and data rate. The legacy STAs may determine that there is no data to be transmitted to themselves during the calculated L-SIG protection period.

For example, the L-SIG protection period may be determined as the sum of the value of the MAC Duration field of the UL MU Trigger frame 2410 and the remaining portion after the L-SIG field of the PPDU delivering the UL MU Trigger frame 2410. Accordingly, the L-SIG protection period may be set to a period of time until the transmission of an ACK frame 2430 (or BA frame) transmitted to each STA, depending on the MAC duration value of the UL MU Trigger frame 2410.

Hereinafter, a method of resource allocation to each STA for UL MU transmission will be described in more detail. A field containing control information will be described separately for convenience of explanation, but the present invention is not limited to this.

A first field may indicate UL MU OFDMA transmission and UL MU MIMO transmission in different ways. For example, '0' may indicate UL MU OFDMA transmission, and '1' may indicate UL MU MIMO transmission. The first field may be 1 bit in size.

A second field (e.g., STA ID/address field) indicates the IDs or addresses of STAs that will participate in UL MU transmission. The size of the second field may be obtained by multiplying the number of bits for indicating an STA ID by the number of STAs participating in UL MU. For example, if the second field has 12 bits, the ID/address of each STA may be indicated in 4 bits.

A third field (e.g., resource allocation field) indicates a resource region allocated to each STA for UL MU transmission. Each STA may be sequentially informed of the resource region allocated to it according to the order in the second field.

If the first field has a value of 0, this indicates frequency information (e.g., frequency index, subcarrier index, etc.) for UL MU transmission in the order of STA IDs/addresses in the second field, and if the first field has a value of 1, this indicates MIMO information (e.g., stream index, etc.) for UL MU transmission in the order of STA IDs/addresses in the second field.

In this case, a single STA may be informed of multiple indices (i.e., frequency/subcarrier indices or stream indices). Thus, the third field may be configured by multiplying the number of bits (or which may be configured in a bitmap format) by the number of STAs participating in UL MU transmission.

For example, it is assumed that the second field is set in the order of STA 1, STA 2, . . . , and the third field is set in the order of 2, 2, . . . .

In this case, if the first field is 0, frequency resources may be allocated to STA 1 and STA2, sequentially in the order of higher frequency region (or lower frequency region). In an example, when 20 MHz OFDMA is supported in an 80 MHz band, STA 1 may use a higher (or lower) 40 MHz band and STA 2 may use the subsequent 40 MHz band.

On the other hand, if the first field is 1, streams may be allocated to STA 1 and STA 2, sequentially in the order of higher-order (or lower-order) streams. In this case, a beamforming scheme for each stream may be prescribed, or the third field or fourth field may contain more specific information on the beamforming scheme for each stream.

Each STA sends a UL MU Data frame 2421, 2422, and 2423 to an AP based on the UL MU Trigger frame 2410. That is, each STA may send a UL MU Data frame 2421, 2422, and 2423 to an AP after receiving the UL MU Trigger frame 2410 from the AP.

Each STA may determine particular frequency resources for UL MU OFDMA transmission or spatial streams for UL MU MIMO transmission, based on the resource allocation information in the UL MU Trigger frame 2410.

Specifically, for UL MU OFDMA transmission, each STA may send an uplink data frame on the same time resource through a different frequency resource.

Here, each of STA 1 to STA 3 may be allocated different frequency resources for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate frequency resource 1, frequency resource 2, and frequency resource 3. In this case, STA 1 to STA 3 sequentially indicated based on the STA ID/address information may be allocated frequency resource 1, frequency resource 2, and frequency resource 3, which are sequentially indicated based on the resource allocation information. That is, STA 1, STA 2, and STA 3 may send the uplink data frame 2421, 2422, and 2423 to the AP through frequency resource 1, frequency resource 2, and frequency resource 3, respectively.

For UL MU MIMO transmission, each STA may send an uplink data frame on the same time resource through at least one different stream among a plurality of spatial streams.

Here, each of STA 1 to STA 3 may be allocated spatial streams for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate spatial stream 1, spatial stream 2, and spatial stream 3. In this case, STA 1 to STA 3 sequentially indicated based on the STA ID/address information may be allocated spatial stream 1, spatial stream 2, and spatial stream 3, which are sequentially indicated based on the resource allocation information. That is, STA 1, STA 2, and STA 3 may send the uplink data frame 2421, 2422, and 2423 to the AP through spatial stream 1, spatial stream 2, and spatial stream 3, respectively.

The PPDU for delivering the uplink data frame 2421, 2422, and 2423 may have a new structure, even without an L-part.

For UL MU MIMO transmission or for UL MU OFDMA transmission in a subband below 20 MHz, the L-part of the PPDU for delivering the uplink data frame 2421, 2422, and 2423 may be transmitted on an SFN (that is, all STAs send an L-part having the same configuration and content). On the contrary, for UL MU OFDMA transmission in a subband above 20 MHz, the L-part of the PPDU for delivering the uplink data frame 2421, 2422, and 2423 may be transmitted every 20 MHz.

As long as the information in the UL MU Trigger frame 2410 suffices to construct an uplink data frame, the HE-SIG field (i.e., a part where control information for a data frame configuration scheme is transmitted) in the PPDU delivering the uplink data frame 2421, 2422, and 2423 may not be required. For example, the HE-SIG-A field and/or the HE-SIG-B field may not be transmitted. Also, the HE-SIG-A field and the HE-SIG C field may be transmitted, but the HE-SIG-B field may not be transmitted.

An AP may send an ACK Frame 2430 (or BA frame) in response to the uplink data frame 2421, 2422, and 2423 received from each STA. Here, the AP may receive the uplink data frame 2421, 2422, and 2423 from each STA and then, after an SIFS, transmit the ACK frame 2430 to each STA.

Using the existing ACK frame structure, an RA field having a size of 6 octets may include the AID (or Partial AID) of STAs participating in UL MU transmission.

Alternatively, an ACK frame with a new structure may be configured for DL SU transmission or DL MU transmission.

The AP may send an ACK frame 2430 to an STA only when an UL MU data frame is successfully received by the corresponding STA. Through the ACK frame 2430, the AP may inform whether the reception is successful or not by ACK or NACK. If the ACK frame 2430 contains NACK information, it also may include the reason for NACK or information (e.g., UL MU scheduling information, etc.) for the subsequent procedure.

Alternatively, the PPDU for delivering the ACK frame 2430 may be configured to have a new structure without an L-part.

The ACK frame 2430 may contain STA ID or address information, but the STA ID or address information may be omitted if the order of STAs indicated in the UL MU Trigger frame 2410 also applies to the ACK frame 2430.

Moreover, the TXOP (i.e., L-SIG protection period) of the ACK frame 2430 may be extended, and a frame for the next UL MU scheduling or a control frame containing adjustment information for the next UL MU transmission may be included in the TXOP.

Meanwhile, an adjustment process may be added to synchronize STAs for UL MU transmission.

FIGS. 25 to 27 are drawings illustrating a resource allocation unit in an OFDMA multi-user transmission scheme according to an embodiment of the present invention.

When a DL/UL OFDMA transmission scheme is used, a plurality of resource units may be defined in units of n tones (or subcarriers) within a PPDU bandwidth.

A resource unit refers to an allocation unit of frequency resource for DL/UL OFDMA transmission.

One or more resource units may be allocated as DL/UL frequency resource to one STA and different resource units may be allocated to a plurality of STAs.

FIG. 25 illustrates a case in which a PPDU bandwidth is 20 MHz.

Seven DC tones may be positioned in a central frequency region of the 20 MHz PPDU bandwidth. Also, six left guard tones may and five right guard tones may be positioned on both sides of the 20 MHz PPDU bandwidth, respectively.

According to a resource unit configuration scheme such as that of FIG. 25(a), one resource unit may be comprised of 26 tones. Also, according to a resource unit configuration scheme such as that of FIG. 25(b), one resource unit may be comprised of 52 tone or 26 tones. Also, according to a resource unit configuration scheme such as that of FIG. 25(c), one resource unit may be comprised of 106 tone or 26 tones. Also, according to a resource unit configuration scheme such as that of FIG. 25(d), one resource unit may be comprised of 242 tones.

The resource unit comprised of 26 tones may include two pilot tones, the resource unit comprised of 52 tones may include four pilot tones, and the resource unit comprised of 106 tones may include four pilot tones.

In a case where a resource unit is configured as illustrated in FIG. 25(a), up to 9 STAs may be supported for DL/UL OFDMA transmission in the 20 MHz band. Also, in a case where a resource unit is configured as illustrated in FIG. 25(b), up to 5 STAs may be supported for DL/UL OFDMA transmission in the 20 MHz band. Also, in a case where a resource unit is configured as illustrated in FIG. 25(c), up to 3 STAs may be supported for DL/UL OFDMA transmission in the 20 MHz band. Also, in a case where a resource unit is configured as illustrated in FIG. 25(d), 20 MHz band may be allocated to one STA.

On the basis of the number of STAs participating in DL/UL OFDMA transmission and/or an amount of data transmitted or received by a corresponding STA, any one of the resource unit configuration schemes illustrated in FIGS. 25(a) to 25(d) may be applied or a combination of the resource unit configuration schemes of FIGS. 25(a) to 25(d) may be applied.

FIG. 26 illustrates a case in which a PPDU bandwidth is 40 MHz.

Five DC tones may be positioned in a central frequency region of the 40 MHz PPDU bandwidth. Also, 12 left guard tones and 11 right guard tones may be positioned on both sides of the 40 MHz PPDU bandwidth, respectively.

According to a resource unit configuration scheme illustrated in FIG. 26(a), one resource unit may be comprised of 26 tones. Also, according to a resource unit configuration scheme illustrated in FIG. 26(b), one resource unit may be comprised of 52 tones or 26 tones. Also, according to a resource unit configuration scheme illustrated in FIG. 26(c), one resource unit may be comprised of 106 tones or 26 tones. Also, according to a resource unit configuration scheme illustrated in FIG. 26(d), one resource unit may be comprised of 242 tones. Also, according to a resource unit configuration scheme illustrated in FIG. 26(e), one resource unit may be comprised of 484 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, and the resource unit comprised of 484 tones may include 16 pilot tones.

When a resource unit is configured as illustrated in FIG. 26(a), up to 18 STAs may be supported for DL/UL OFDMA transmission in the 40 MHz band. Also, when a resource unit is configured as illustrated in FIG. 26(b), up to 10 STAs may be supported for DL/UL OFDMA transmission in the 40 MHz band. Also, when a resource unit is configured as illustrated in FIG. 26(c), up to 6 STAs may be supported for DL/UL OFDMA transmission in the 40 MHz band. Also, when a resource unit is configured as illustrated in FIG.

26(d), up to 2 STAs may be supported for DL/UL OFDMA transmission in the 40 MHz band. Also, when a resource unit is configured as illustrated in FIG. 26(e), a corresponding resource unit may be allocated to one STA for SU DL/UL transmission in the 40 MHz band.

On the basis of the number of STAs participating in DL/UL OFDMA transmission and/or an amount of data transmitted or received by a corresponding STA, any one of the resource unit configuration schemes illustrated in FIGS. 26(a) to 26(e) may be applied or a combination of the resource unit configuration schemes of FIGS. 26(a) to 26(e) may be applied.

FIG. 27 illustrates a case in which a PPDU bandwidth is 80 MHz.

Seven DC tones may be positioned in a central frequency region of the 80 MHz PPDU bandwidth. However, in a case where the 80 MHz PPDU bandwidth is allocated to one STA (that is, in a case where a resource unit comprised of 996 tones is allocated to one STA), five DC tones may be positioned in the central frequency region. Also, 12 left guard tones and 11 right guard tones may be positioned on both sides of the 80 MHz PPDU bandwidth, respectively.

According to a resource unit configuration scheme illustrated in FIG. 27(a), one resource unit may be comprised of 26 tones. Also, according to a resource unit configuration scheme illustrated in FIG. 27(b), one resource unit may be comprised of 52 tones or 26 tones. Also, according to a resource unit configuration scheme illustrated in FIG. 27(c), one resource unit may be comprised of 106 tones or 26 tones. Also, according to a resource unit configuration scheme illustrated in FIG. 27(d), one resource unit may be comprised of 242 tones or 26. Also, according to a resource unit configuration scheme illustrated in FIG. 27(e), one resource unit may be comprised of 484 tones or 26 tones. Also, according to a resource unit configuration scheme illustrated in FIG. 27(f), one resource unit may be comprised of 996 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, the resource unit comprised of 484 tones may include 16 pilot tones, and the resource unit comprised of 996 tones may include 16 pilot tones.

When a resource unit is configured as illustrated in FIG. 27(a), up to 37 STAs may be supported for DL/UL OFDMA transmission in the 80 MHz band. Also, when a resource unit is configured as illustrated in FIG. 27(b), up to 21 STAs may be supported for DL/UL OFDMA transmission in the 80 MHz band. Also, when a resource unit is configured as illustrated in FIG. 27(c), up to 13 STAs may be supported for DL/UL OFDMA transmission in the 80 MHz band. Also, when a resource unit is configured as illustrated in FIG. 27(d), up to 5 STAs may be supported for DL/UL OFDMA transmission in the 80 MHz band. Also, when a resource unit is configured as illustrated in FIG. 27(e), up to 3 STAs may be supported for DL/UL OFDMA transmission in the 80 MHz band. Also, when a resource unit is configured as illustrated in FIG. 27(f), a corresponding resource unit may be allocated to one STA for SU DL/UL transmission in the 80 MHz band.

On the basis of the number of STAs participating in DL/UL OFDMA transmission and/or an amount of data transmitted or received by a corresponding STA, any one of the resource unit configuration schemes illustrated in FIGS. 27(a) to 27(f) may be applied or a combination of the resource unit configuration schemes of FIGS. 27(a) to 27(f) may be applied.

Figure 32:
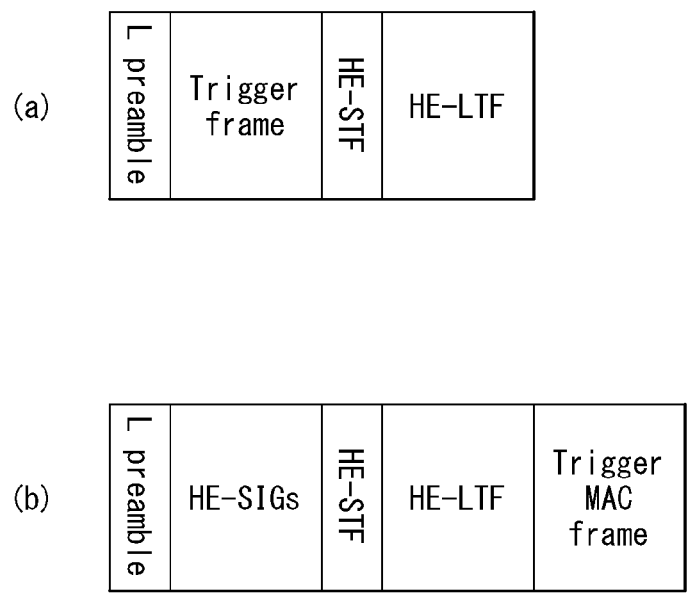
FIG. 32 illustrates a DL PPDU format transmitted and received through a sounding protocol according to the third embodiment of the present invention.

In addition, although not shown, a resource unit configuration scheme in a case where a PPDU bandwidth is 160 MHz may also be proposed. In this case, the 160 MHz PPDU bandwidth may have a structure in which the aforementioned 80 MHz PPDU bandwidth described in FIG. 32 is repeated twice.

Among the entire resource units determined according to the aforementioned resource unit configuration schemes, only some resource units may be used for DL/UL OFDMA transmission. For example, in a case where resource units are configured as illustrated in FIG. 30(a) within 20 MHz, one resource unit is allocated to each of less than 9 STAs and the other resource units may not be allocated to any STA.

In the case of DL OFDMA transmission, a data field of a PPDU is multiplexed in a frequency domain by the resource unit allocated to each STA and transmitted.

Meanwhile, in the case of UL OFDMA transmission, each STA may configure a data field of a PPDU by the resource unit allocated thereto and simultaneously transmit the PPDU to an AP. In this manner, since each STA simultaneously transmits the PPDU, the AP, a receiver, may recognize that the data field of the PPDU transmitted from each STA is multiplexed in the frequency domain and transmitted.

Also, in a case where both DL/UL OFDMA transmission and DL/UL MU-MIMO transmission are supported, one resource unit may include a plurality of streams in a spatial domain. Also, one or more streams may be allocated as a DL/UL spatial resource to one STA, and thus, different streams may be allocated to a plurality of STAs.

For example, a resource unit comprised of 106 tones in FIG. 25(c) includes a plurality of streams in the spatial domain to support both DL/UL OFDMA and DL/UL MU-MIMO.

Channel State Information Feedback Method of the Next-Generation System

As described above, in the next-generation WLAN system, UL MU transmission of an STA has been made possible due to adoption of the OFDMA technology. As a result, for a sounding protocol (or sequence) for reporting (or feedback) channel state information (or feedback information) with respect to a DL channel, too, it was made possible for a plurality of STAs to perform UL MU transmission of channel state information simultaneously to an AP. In this case, it is necessary for a UL MU transmission resource to be allocated to each STA to avoid collision among channel state information transmitted by a plurality of STAs. Therefore, the sounding protocol of the next-generation system may require a procedure for transmitting and receiving a trigger frame including allocation information (or trigger information) of a UL MU transmission resource with respect to each STA, which will be described in detail with reference to FIG. 28.

Figure 28:
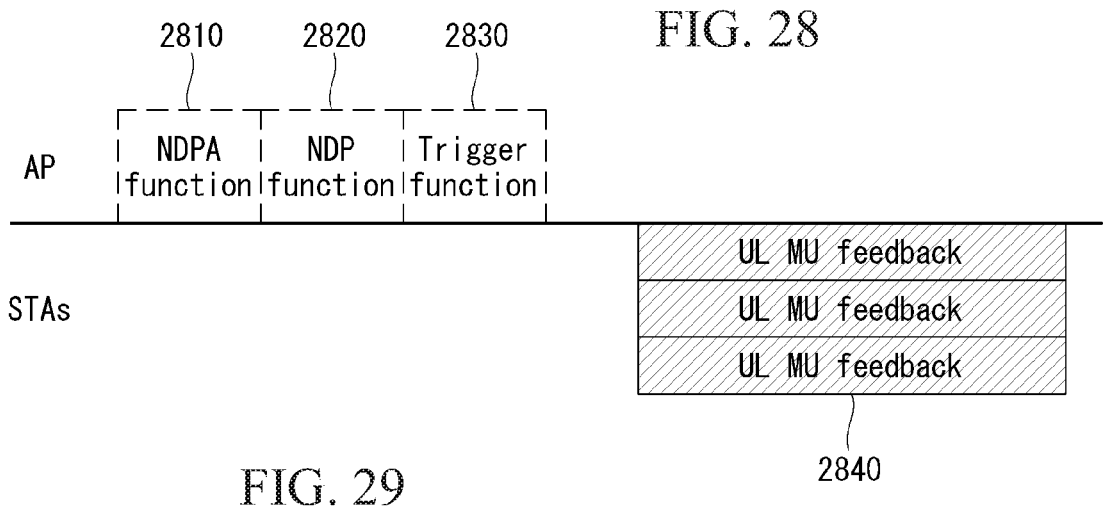
FIG. 28 illustrates a sounding protocol according to one embodiment of the present invention.

FIG. 28 illustrates a sounding protocol according to one embodiment of the present invention. The descriptions given with reference to FIGS. 7 to 11 may be applied to describe the present drawing in the same/similar way, and in what follows, only the difference from the descriptions given with reference to FIGS. 7 to 11 will be described.

Referring to FIG. 28, an AP may transmit an NDPA frame (or NDPA function/information) 2810 that notifies of transmission of an NDP frame 2820 (or initiates a sounding protocol) to STAs. An NDPA frame 2810 may include control information about a sounding protocol. For example, the NDPA frame 2810 may include feedback indication information (or sounding indication information) about which STA measures, which DL channel, how to measure, and so on.

Also, an AP may transmit to STAs an NDP frame (or NDP function/information) 2820 that indicates information about a target DL channel to be measured by the STAs. The NDP frame 2820 may include an HE-STF/LTF that indicates information about a DL channel to be measured (or may include an HE-STF/LTF for sounding of a DL channel (or DL CSI (Channel State Information)). At this time, the NDP frame 2820 may include a number of HE-LTFs equal to or larger than the number of spatial streams for which an STA reports a channel state.

Also, the AP may transmit a trigger frame (or trigger function/information) 2830 that triggers UL MU transmission to STAs. The trigger frame 2830 may include resource allocation information about UL MU resources allocated to the individual STAs for UL MU transmission of channel state information about the DL channel. At this time, description about the frequency resource allocation unit that may be allocated to each STA is the same as given with reference to FIGS. 25 to 27.

The STAs that have received the trigger frame 2830 may obtain channel state information by measuring the DL channel indicated by the NDPA frame 2810 and the trigger frame 2830. The STAs may generate a feedback frame (or beamforming frame/beamforming feedback frame) 2840 which includes the obtained channel state information and perform UL MU transmission of the generated feedback frame 2840 by using the UL MU resources allocated to the STAs.

Compared with the sounding protocol in the legacy system shown in FIG. 7, since the STAs perform UL MU transmission of a feedback frame including the channel state information simultaneously according to the sounding protocol of the present invention, there will be less overhead in terms of time.

In the sounding protocol of the present invention, the NDPA frame 2810, NDP frame 2820, and trigger frame 2830 may be transmitted through different DL PPDUs depending on the embodiments, or they may be transmitted through one DL PPDU.

Figure 29:
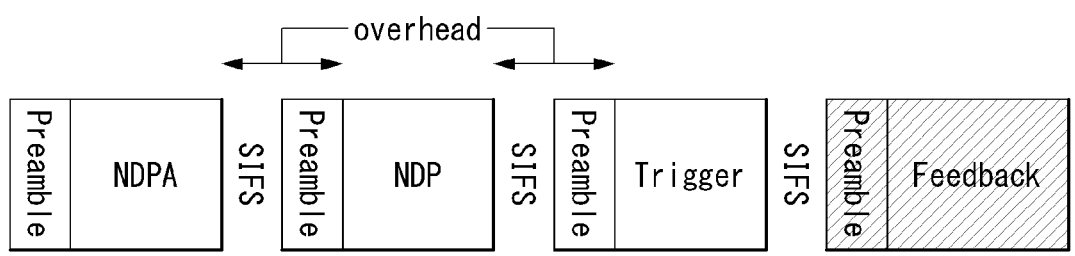
FIG. 29 illustrates a sounding protocol according to a first embodiment of the present invention.

FIG. 29 illustrates a sounding protocol according to a first embodiment of the present invention.

Referring to FIG. 29, the NDPA frame, NDP frame, and trigger frame may be transmitted by being included in separate DL PPDUs; and may be transmitted sequentially. In the present figure, the preamble refers to a physical preamble including a legacy preamble and an HE preamble. However, the preamble of a DL PPDU including the NDP frame may refer to a physical preamble including the legacy preamble and the HE preamble excluding the HE-STF and/or HE-LTF; at this time, the NDP frame may include the HE-STF and/or HE-LTF. In other words, the DL PPDU including an NDP frame may include HE-STF and/or HE-LTF as well as the legacy preamble; and may correspond to a physical preamble except for only the data part of a PPDU.

At this time, individual DL PPDUs may be transmitted through DL transmission at regular intervals (for example, SIFS (Short Interframe Space)) sequentially (or continuously). For example, a second DL PPDU including an NDP frame may be transmitted after SIFS from that a first DL PPDU including an NDPA frame is transmitted. Also, a third DL PPDU including a trigger frame may be transmitted after SIFS from that a second DL PPDU is transmitted. Also, an UL PPDU including a feedback frame may be transmitted after SIFS from that the third PPDU is transmitted.

As described above, when the NDPA frame, NDP frame, and trigger frame are transmitted by being included in the respective DL PPDUs, large overhead may be caused. From the example above, it may be seen that large overhead in terms of time is caused due to the preamble of the second DL PPDU, preamble of the third DL PPDU, and two SIFS intervals.

Therefore, to reduce the overhead, the present invention proposes a method that transmits the NDPA frame, NDP frame, and trigger frame together in one or two DL PPDUs, which, in this case, overlapping information is removed for the transmission. More detailed descriptions related to the proposed method will be given below with reference to FIG. 30.

Figure 30:
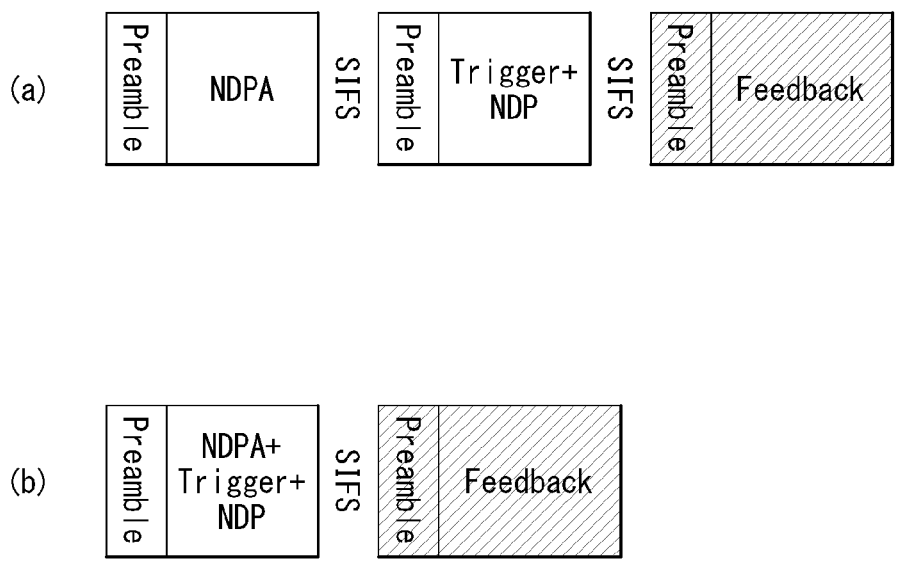
FIG. 30 illustrates a sounding protocol according to a second and a third embodiment.

FIG. 30 illustrates a sounding protocol according to a second and a third embodiment. More specifically, FIG. 30(a) illustrates a sounding protocol according to a second embodiment of the present invention, and FIG. 30(b) illustrates a sounding protocol according to a third embodiment of the present invention, respectively.

Referring to FIG. 30(a), to reduce the overhead described in detail with reference to FIG. 29, the AP may transmit the NDP frame and the trigger frame through one DL PPDU. In other words, the AP may combine the NDP frame and the trigger frame and transmit the combined frame through one DL PPDU to reduce the overhead. This operation may be interpreted that the AP generates at least one frame that performs both of the function of an NDP frame (or NDP function) and the function of a trigger frame (or trigger function) and transmits the corresponding frame through one DL PPDU.

For example, the AP may transmit a first DL PPDUU including an NDPA frame and transmit a second DL PPDU including an NDP frame (NDP function) and trigger frame (trigger function) after SIFS. The STA(s) which has received the first and the second DL PPDU may generate a feedback frame including channel state information with respect to a DL channel indicated for measurement and transmit an UL (SU/MU) PPDU carrying the generated feedback frame to the AP.

The second embodiment provides an advantage of removing the overhead (SIFS and a physical preamble of a DL PPDU including NDP frame) which may be caused when the NDP frame and the trigger frame are transmitted through different DL PPDUs.

Referring to FIG. 30(b), to reduce the overhead described in detail with reference to FIG. 29, the AP may transmit the NDPA frame, NDP frame, and trigger frame through one DL PPDU. In other words, to reduce the overhead, the AP may combine the NDPA frame, NDP frame, and trigger frame; and transmit the combined frame through one DL PPDU. This operation may be interpreted that the AP generates at least one frame that performs all of the function of an NDPA frame (or NDPA function), the function of an NDP frame (or NDP function), and the function of a trigger frame (or trigger function) and transmits the corresponding frame through one DL PPDU.

For example, the AP may transmit a DL PPDU which includes all of the NDPA frame (NDPA function), NDP frame (NDP function), and trigger frame (trigger function) to the STA(s), and the STA(s) may transmit an UL (SU/MU) PPDU including channel state information about a DL channel indicated for measurement to the AP after SIFS.

The third embodiment provides an advantage of removing the overhead (two SIFS intervals and a physical preamble of DL PPDUs including an NDP/trigger frame) that may be caused when the NDPA frame, NDP frame, and trigger frame are transmitted through separate DL PPDUs.

However, when the AP combines the NDPA frame, NDP frame, and trigger frame by simple integration and transmits the combined frame, the same information in each frame may be contained repeatedly in one DL PPDU, which causes overhead. Also, as the OFDMA technology is introduced in the next-generation WLAN system, the AP may have to transmit frequency information additionally to indicate a frequency resource unit (for example, 26 tone resource units located at a second and a third position from the left side of 20 MHz channel) so that the STA measures the frequency resource unit and provides the measurements as feedback. Therefore, in what follows, the information that may be included in a frame transmitted and received in the second or third embodiment is proposed.

Figure 31:
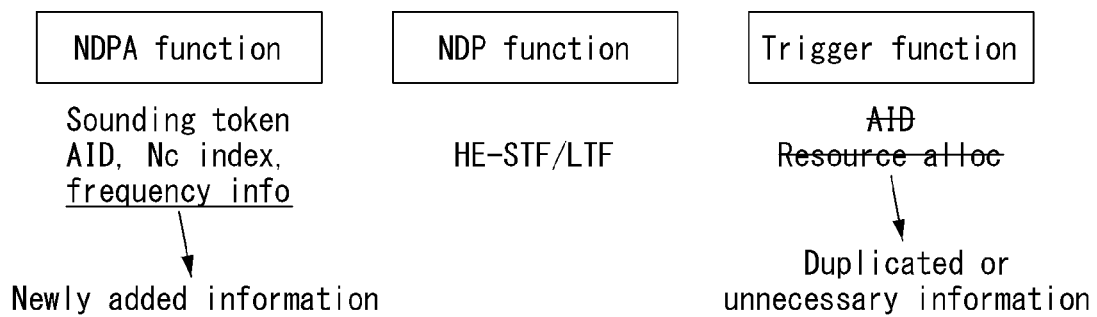
FIG. 31 illustrates information included respectively in an NDPA frame, NDP frame, and trigger frame according to one embodiment of the present invention.

FIG. 31 illustrates information included respectively in an NDPA frame, NDP frame, and trigger frame according to one embodiment of the present invention.

Referring to FIG. 31, an NDPA frame (or NDPA function) may include frequency information (or field) in addition to sounding (dialog) token information (or field), AID information (or field) of an STA, and Nc index information (or field). Here, frequency information may represent the information indicating a frequency resource unit that is a subject to be measured by an STA to report channel state as described above. Therefore, an STA which has received frequency information may measure the channel state of a frequency resource unit indicated by received frequency information and provide feedback (or report) to the AP. The frequency information may be included in the NDPA frame selectively according to an embodiment. Meanwhile, the NDPA frame described in the present figure is only an example. Therefore, part (or field) of the illustrated information (or field) may be excluded, or new information may be added to form the NDPA frame.

In the case of a trigger frame, since the AID information (or field) overlaps the AID information (or field) of an STA, which is included in the NDPA frame, the corresponding AID information may be excluded to form the trigger frame. Also, if a frequency/spatial resource allocated for an STA to perform UL MU transmission of a feedback frame is set in advance (namely if the frequency/spatial resource is fixed to the frequency resource unit having a predetermined size), the trigger frame may be configured by also excluding the resource allocation information.

In this way, if the trigger frame is configured after part of the information thereof is excluded, the number of configuration bits for the trigger frame is reduced. Therefore, if sounding protocol is performed according to the second or third embodiment, it is possible for the AP to combine a trigger frame with an NDPA frame and/or an NDP frame into one frame.

In what follows, the DL PPDU format for transmission and reception according to a sounding protocol of the third embodiment will be described in more detail. In other words, in what follows, the format of a DL PPDU will be described in detail for the case where an NDPA frame, NDP frame, and trigger frame are transmitted through one DL PPDU.

Figure 33:
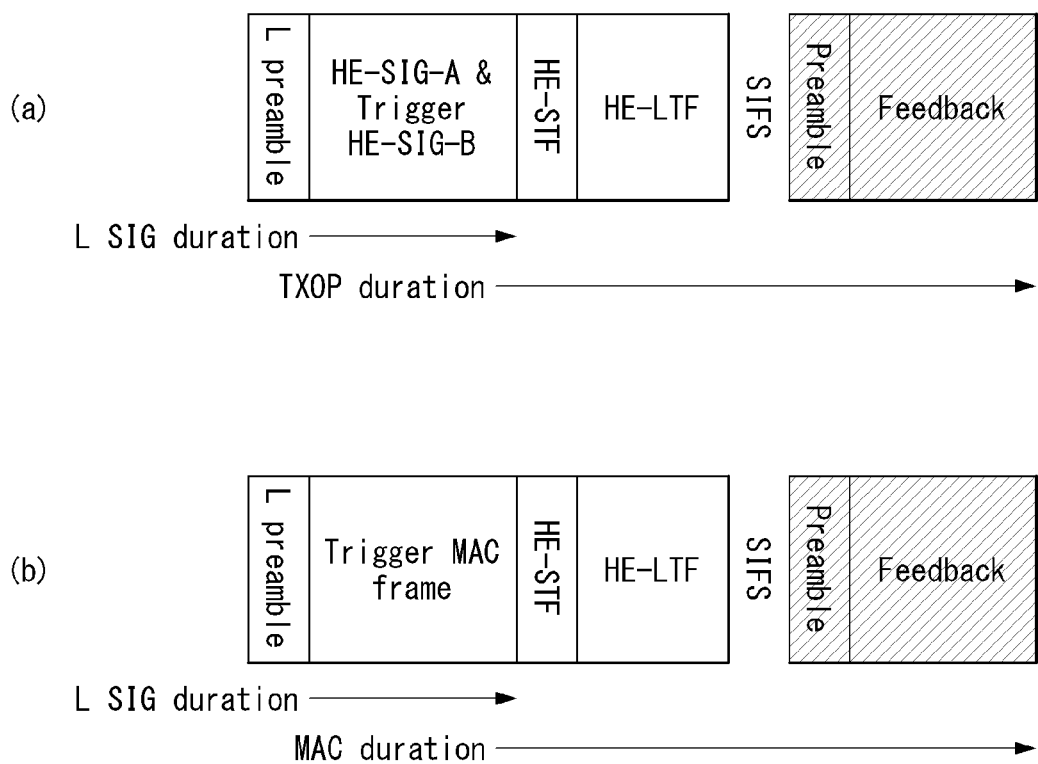
FIG. 33 illustrates a specific embodiment of the DL PPDU format of FIG. 32(a).

FIG. 32 illustrates a DL PPDU format transmitted and received through a sounding protocol according to the third embodiment of the present invention. FIG. 33 illustrates a specific embodiment of the DL PPDU format of FIG. 32(a). In the present figures, L preamble represents a legacy preamble. Also, a trigger frame appearing in the present figures may refer to a frame performing the NDPA function and the trigger function. In other words, a trigger frame in the present figures may refer to a frame configured by combining an NDPA frame and a trigger frame.

Referring to FIG. 32(a), a trigger frame in a DL PPDU for channel sounding may be located before the HE-STF and HE-LTF. In other words, a DL PPDU for channel sounding may be composed in the order of a legacy preamble, trigger frame, HE-STF, and HE-LTF. The HE-STF and HE-LTF following the trigger frame may be used as information for STAs to measure DL channel state.

The trigger frame may be built on the PHY structure or MAC structure. More specifically, referring to FIG. 33(a), the trigger frame based on the PHY structure may be composed of HE-SIG A field and HE-SIG B field. At this time, the trigger field may be included in the HE-SIG B field, and NDPA information may be included in the HE-SIG A field or HE-SIG B field. Also, referring to FIG. 33(b), the trigger frame based on the MAC structure may be implemented by a PPDU structure excluding the legacy preamble (L-STF/LTF/SIG). For example, the trigger frame based on the MAC structure may be constructed according to the HE frame format containing trigger information. Alternatively, the trigger frame based on the MAC structure may be constructed by including the HE-frame comprising the HE-preamble and trigger information for robust transmission in the outdoor environment.

The STA(s) not instructed to measure (or report) channel state (namely the STA(s) whose AID is not included in the AID field of the NDPA frame (or information)) may set the NAV to the TXOP duration (refer to FIG. 33(a)) indicated by the HE-SIG A/B field or to the MAC duration (refer to FIG. 33(b)) indicated by the trigger frame.

Also, the STA(s) instructed to measure (or report) channel state (namely the STA(s) whose AID is included in the AID field of the NDPA frame (or information)) may read the L-SIG duration and know the length of the trigger frame. More specifically, in the case of FIG. 33(a), the STA(s) may read the L-SIG duration from the legacy preamble and learn the length of the HE-SIG A/B field corresponding to the trigger frame based on the PHY structure. Alternatively, in the embodiment of FIG. 33(b), the STA(s) may read the L-SIG duration and learn the length of the trigger frame based on the MAC structure. Also, the STA(s) may read the trigger frame (or information) to know that the corresponding frame is a frame indicating measurement of the DL channel state. Furthermore, the STA(s) may know through the trigger frame (or information) that an HE-STF/LTF for DL channel state measurement follows the trigger frame and in which way the HE-STF/LTF is composed. As a result, the STA(s) may measure the DL channel state by using the corresponding HE-STF/LTF and perform UL transmission of the measurement result to the AP as a feedback frame.

Meanwhile, although not shown in FIG. 33, to allow the STA instructed to perform channel measurement to have time for preparing channel measurement, the HE-STF/LTF following the trigger frame may not be transmitted immediately after the trigger frame but may be transmitted at intervals of SIFS. At this time, the AP may empty the interval of SIFS (namely may not transmit any signal during the interval of SIFS) or may transmit a dummy signal. Alternatively, by adding MAC or PHY padding between the trigger frame and the HE-STF/LTF, the AP may allow the STA to have time for preparing for channel measurement.

Referring to FIG. 32(b) again, in the DL PPDU for channel sounding, the trigger frame may be located after the HE-STF and HE-LTF differently from FIG. 32(a). In other words, the DL PPDU for channel sounding may be composed in the order of a legacy preamble, HE-SIG field (for example, HE-SIG A/B/C field), HE-STF, HE-LTF, and trigger frame. The HE-STF and HE-LTF following the trigger frame may be used as information for STAs to measure the DL channel state.

In the present embodiment, the DL PPDU including a trigger frame may be constructed according to the DL MU PPDU (DL MU PPDU including the trigger frame) structure proposed in the 802.11ax system. However, the function of the HE-STF/LTF preceding the trigger frame may be extended so that an STA may not only read a trigger frame but also measure DL channel state.

For example, even if a trigger frame is transmitted through one spatial stream, all of the channel information about 8 spatial streams may be transmitted by being carried by the HE-LTF. To this purpose, a number of HE-LTFs equal to or larger than the number of spatial streams to be measured may be transmitted by being included in the DL PPDU. Therefore, in the aforementioned example, 8 (or more) HE-LTFs may be transmitted by being included in the DL PPDU. To read a trigger frame, the STA which has received the corresponding HE-LTF may estimate the channel for one spatial stream through which the trigger frame has been transmitted, and to measure the DL channel state, the STA may estimate/measure the channel of 8 spatial streams and generate channel state information about the corresponding channel.

If the AP instructs only part of the spatial streams from among the entire spatial streams to report channel state information (for example, through an NDPA frame (or information)), the STA may estimate/measure the channel only for the spatial stream indicated by the AP and provide the measurement result to the AP as feedback. An embodiment in which the AP indicates a channel measurement area (frequency/spatial stream) will be described in more detail below.

UL MU Transmission of Feedback Frame

In order for STAs to perform UL MU transmission of a feedback frame simultaneously without collision, each of the STAs has to know which resource unit is allocated to itself. To this purpose, in one embodiment, each STA may receive the resource allocation information (or trigger information) for transmission of a feedback frame directly from the AP through a trigger frame. Or, in another embodiment, to reduce signaling overhead, a resource unit allocated to each STA for transmission of a feedback frame may be predetermined. Or each STA may obtain/estimate the resource allocation information for transmission of a feedback frame directly by calculating the resource allocation information according to a predetermined mathematical equation.

A frequency unit may be defined as a minimal unit of a frequency resource allocated to each STA for transmission of a feedback frame. Here, a frequency unit may be the concept corresponding to the resource unit described in detail with reference to FIGS. 25 to 27. Therefore, the frequency unit may correspond to a 26 tone, 52 tone, 106 tone, 242 tone, 484 tone, or 996 tone resource unit. In what follows, for the convenience of descriptions, it is assumed that the frequency unit is a 26 tone resource unit.

The frequency units may be allocated sequentially in the order of STA AID included in the AID field by a predetermined number of units, and the number of frequency units allocated to each STA may be determined by the method proposed below.

1. Method for Allocating Frequency Units by Dividing the Frequency Units by the Number of STAs.

The AP may divide the entire frequency units that may be allocated to STAs for UL MU transmission of a feedback frame into sub-groups according to the number of STAs and allocate the sub-groups of frequency units to individual STAs. In other words, if (the number of entire frequency units/the number of STAs)=x, where x is a natural number, the AP may allocate x frequency units to each STA. If the division of the total number of allocatable frequency units by the number of STAs leaves a non-zero remainder, frequency units located in the middle may be left unallocated to any STA or allocated to a specific STA. For example, the AP may allocate as many frequency units as the number y greater than or equal to division of the entire frequency units by the number of STAs (namely ceiling(x)=y) to a specific STA and may allocate as many frequency units as the number z less than or equal to the division (namely floor (x)=z) to the remaining STAs.

As described above, frequency units for which the number of allocations have been determined may be allocated to each STA sequentially in the frequency domain. For example, if three 26 tone resources units for transmission of a feedback frame are allocated to each of STA 1 to 3, the first to third 26 tone resource units may be allocated to STA 1 in the 20 MHz channel, the fourth to sixth 26 tone resource units may be allocated to STA 2 in the 20 MHz channel, and the seventh to ninth 26 tone resource units may be allocated to STA 3 in the 20 MHz channel.

Therefore, each STA may find out the location of a frequency unit allocated to itself by accumulating the number of frequency units allocated to other STAs corresponding to different AIDs listed before the AID of the STA in the AID field included in the NDPA frame or trigger frame.

2. Method for Allocating Frequency Units According to the Amount of Feedback

The AP may determine the number of frequency units allocated to each STA on the basis of the amount of feedback information that the STA has to transmit. More specifically, the AP may determine the number of frequency units allocated to each STA in proportion to the amount of feedback information (or the amount of channel state information) that each STA has to transmit.

In one embodiment, the AP may determine the number of frequency units allocated to each STA on the basis of the number of spatial streams that each STA has to provide as feedback information. More specifically, the AP may determine the number of frequency units allocated to each STA in proportion to the number of spatial streams that each STA has to provide as feedback information. For example, the AP may instruct STA 1 to provide channel state about one spatial stream and instruct STA 2 to provide channel state about 8 spatial streams as feedback information. In this case, since STA 1 has to perform UL MU transmission of channel state information about one spatial stream, and STA 2 has to perform UL MU transmission of channel state information about 8 spatial streams, the amount of feedback information that the STA 2 has to transmit may be larger than that for the STA 1. Therefore, the AP may allocate one frequency unit to STA 1 and 8 frequency units to STA 2, respectively.

In another embodiment, the AP may determine the number of frequency units allocated to each STA on the basis of feedback unit to which each STA generated a feedback value. More specifically, the AP may determine the number of frequency units allocated to each STA in inverse proportion to the feedback unit to which each STA generates a feedback value. Here, the feedback value may include SNR (Signal to Noise Ratio) or beamforming feedback matrix (or beamforming feedback vector) in feedback units preset with respect to the MCS level or spatial stream, and if the beamforming method is changed, beamforming feedback values with respect to the changed beamforming method may all be included.

The larger the feedback unit to which an STA has to generate feedback values, the smaller the amount of information that has to be provided as feedback information; on the other hand, the smaller the feedback unit, the larger the amount of information becomes. For example, suppose the feedback unit to which an STA has to generate feedback values is 26 tones. In this case, an STA has to generate (or obtain) one feedback value every 26 tones, and if the STA attempt to provide feedback with respect to a 20 MHz channel, the STA has to generate (or obtain) a total of 9 feedback values and transmit the feedback values to the AP as channel state information. On the other hand, suppose the feedback unit to which an STA has to generate feedback values is a 20 MHz channel. In this case, an STA has to generate (or obtain) a total of one feedback value with respect to the 20 MHz channel and transmit the feedback value to the AP as channel state information. In other words, since the amount of feedback information (or amount of channel state information) becomes smaller as the feedback unit to which an STA has to provide feedback values (or has to generate feedback values) gets larger, the AP allocates more frequency units for the case where the feedback unit for feedback generation is 26 tones than for the case of 20 MHz channel.

In a yet another embodiment, since STAs know the length of the UL MU feedback frame from indication by the AP, they may calculate themselves the number of frequency units required for transmission of feedback information (or channel state information) according to the indicated length of the UL MU feedback frame. Also, an STA may find out the locations of frequency units allocated to itself by accumulating not only the number of frequency units allocated to itself but also the number of frequency units allocated to other STAs corresponding to the AID(s) listed before the STA's AID in the AID field.

3. Method for Allocating Frequency Units Directly by an AP

An AP may directly allocate at least one frequency unit to each STA and transmit allocation information (or resource allocation information) of the frequency unit to each STA through a trigger frame. At this time, allocation information of the frequency unit may be signaled for various embodiments.

In one embodiment, resource allocation information may be signaled to indicate the number of frequency units allocated to each STA in bit values. For example, if nine 26 tone resource units of a 20 MHz channel are allocated to each STA as a frequency unit, the resource allocation information may be configured by 3 bits. In this case, the bit value of '000' to '111' for the resource allocation information may indicate allocation of 1/2/3/4/5/6/7/9 frequency units (or 26 tone resource units), respectively. In other words, an STA which has received resource allocation information of '000' may determine that the number of frequency units (or 26 tone resource units) allocated to itself is 1 and perform UL MU transmission of a feedback frame by using this.

In another embodiment, allocation information of a frequency unit may be signaled in a toggling scheme to indicate the number of frequency units allocated to an STA. For example, when nine 26 tone resource units of a 20 MHz channel are allocated to each STA as a frequency unit, the resource allocation information may be configured by 9 bits corresponding sequentially to the nine 26 tone resource units. In this case, each individual bit comprising the resource allocation information may be switched to a different bit value from the previous bit value as the STA to which the resource unit corresponding to each bit is allocated is changed to a different STA. For example, the resource allocation information having the value of '000110011' may indicate that 3/2/2/2 frequency units are allocated respectively according to the order of STAs included in the AID field.

4. Method for an AP to Indicate Index of a Frequency Unit

In the embodiments described above, each STA may directly obtain (or calculate) the location on the channel of a frequency unit allocated to itself by accumulating the number of frequency units allocated to other STAs corresponding to the AIDs listed before the AID of the STA through the AID field. However, this information may also be indicated by the AP explicitly by providing the information directly to each STA as trigger information. In this case, different indices may be allocated to the respective locations of the frequency units (or resource units) belonging to a channel, and the AP may indicate the locations of the frequency units allocated to the respective STAs by transmitting the indices to the STAs.

When the AP allocates consecutive frequency units on a frequency channel to each STA, the AP may inform the STA about the indices of only those frequency units located at starting points (or at the leftmost or rightmost point) among the frequency units allocated consecutively. In this case, according to the embodiments above, each STA may know the number of frequency units allocated to itself, the STA may determine the frequency units allocated to itself by counting from the starting point as many frequency units as allocated to itself.

Alternatively, each STA, instead of applying the embodiment described above, may determine the number of frequency units allocated to itself and their locations by reading the start index of the frequency units allocated to itself and the start index of frequency units allocated to the next STA. Or, the AP may inform of the index of the frequency unit located at the end point (or last point) among the frequency units allocated to each STA instead of the start index. In this case, each STA may determine the number of frequency units allocated to itself and their locations by additionally reading from the received AID field the end point index of the STA corresponding to the previous AID of its AID.

Up to this point, a method for allocating and indicating UL MU resources for each STA to perform UL MU transmission of a feedback frame has been described. According to the embodiment described above, frequency units for transmission of feedback frames are allocated to each STA. At this time, there are times when the total number of frequency units allocated to an STA becomes larger than the number of frequency units included in a channel. In this case, part of STAs may transmit feedback frames in the next occasion. To this purpose, the AP may receive a UL MU feedback frame and after SIFS, transmit a beamforming report poll frame or a trigger frame that performs the role of polling/ACK, where the information included in the trigger frame is described below.

ACK information about information provided previously as feedback information

AID of STAs for the next feedback (the AID of only the STA supposed to start UL MU transmission may be informed), re-ordered index information with respect to each STA (when the start or end point index of frequency units allocated to each STA is informed).

Method for Determining a Feedback Unit for DL Channel Measurement

In the present embodiment, a frequency unit for measuring a DL channel or for providing a DL channel as feedback is defined as a 'feedback unit'; and various methods for determining a feedback unit will be described in detail.

In the conventional system, a feedback unit comprises 1 to 4 subcarriers. Therefore, the maximum number of feedback transmission was determined as many as the number of subcarriers, thereby causing feedback overhead.

In the 802.11ax system, the next-generation WLAN system, the number of subcarriers is increased beyond the number of subcarriers employed in the conventional system. Therefore, if a method used for the conventional system is retained, feedback overhead may be increased up to four times the overhead of the conventional system. And since channels of neighbor subcarriers may be regarded as being similar to each other, the amount of feedback information may be reduced by setting the feedback unit depending on the needs as described in the following embodiments.

(1) The whole transmission band of an UL MU PPDU may be set as one feedback unit. In this case, an STA reports only one feedback value to the AP.

(2) A 26 tone resource unit may be set as one feedback unit. In this case, if the whole transmission band of an UL MU PPDU carrying a feedback frame is a 20 MHz band, the STA reports a total of 9 feedback values to the AP. At this time, the STA may report all of the 9 feedback values or report only part of the feedback values according to the AP's instruction, which will be described in detail below.

(3) A 20 MHz subchannel may be set as one feedback unit. In this case, for example, if the whole transmission band of an UL MU PPDU that carriers a feedback frame is an 80 MHz band, each STA reports a total of 4 feedback values to the AP. In this case, too, the STA may report all of the feedback values or only part of the feedback values according to the AP's instruction, which will be described in detail below.

Method for Measuring a DL Channel

In the conventional system, an STA measures the HE-LTF over the whole frequency band of the DL/UL PPDU and provides the measurements as feedback information; since the 802.11ax system, the next-generation WLAN system, adopts the OFDMA technology, an AP may request STAs to measure only part of the frequency band for reporting. In other words, in the next-generation WLAN system, the AP may instruct an STA to measure not only the whole frequency band but also part of the frequency band for reporting. In other words, the measurement band resources to be reported by STAs may be set to be the same as or smaller than the size of frequency resources of an NDP frame transmitted over the whole frequency band. In particular, since the overhead is not insignificant when a beamforming feedback matrix for the resources of the same size as the frequency resources of an NDP frame transmitted over the whole frequency band is generated and transmitted (or when transmission is performed through a feedback frame), the measurement band resources to be reported (or to be provided as feedback/to which the beamforming feedback matrix is to be transmitted) by STAs may be set to be the same as or smaller than the resource size of an NDP frame.

For example, the AP may instruct an STA to measure and report channel state of a specific 20 MHz band out of an 80 MHz band. Or, if a feedback unit is set on the basis of a 26 tone resource unit, the AP may instruct an STA to measure and report the channel state with respect to a specific feedback unit. For example, if an index is allocated to each 26 tone resource unit for identifying a feedback unit, the AP may indicate a feedback unit that an STA has to measure by transmitting to the STA an index of a feedback unit to be reported/measured by the STA.

In another embodiment, an AP may instruct an STA to provide feedback only for a band the channel state of which is in a good condition from among the bands measured by the STA. In this case, the STA may transmit information about a band the channel state of which is in a good condition together with a feedback value of the corresponding band. For example, suppose nine feedback units are configured on the basis of 26 tone resource units in a 20 MHz channel. Then an AP may instruct an STA to report with respect to only the feedback unit exhibiting the best channel condition out of the nine feedback units. In this case, the STA may perform UL MU transmission of information about the feedback unit exhibiting the best channel condition (for example, index or location information of the corresponding feedback unit) and a feedback value measured with respect to the corresponding feedback unit by including them in a feedback frame.

Figure 34:
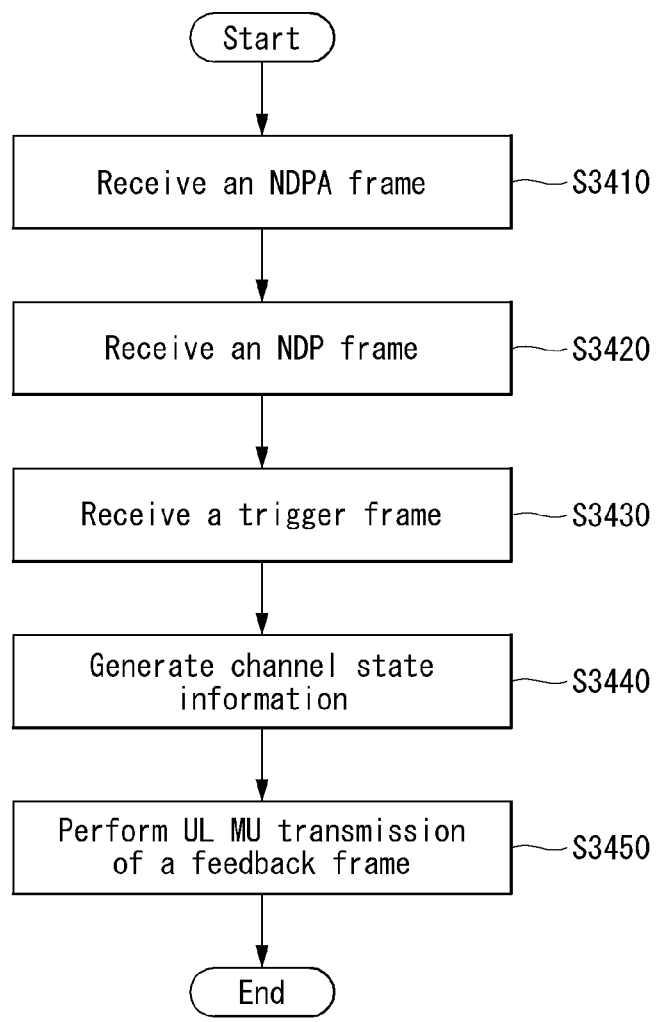
FIG. 34 is a flow diagram illustrating a sounding method for an STA according to one embodiment of the present invention.

FIG. 34 is a flow diagram illustrating a sounding method for an STA according to one embodiment of the present invention. The embodiments described in detail above may be applied in the same manner in association with the flow diagram. Therefore, in what follows, repeated descriptions will be omitted.

Referring to FIG. 34, first of all, an STA may receive an NDPA frame notifying of transmission of an NDP frame from an AP S3410. At this time, the NDPA frame received by the STA may include various pieces of control information about a sounding protocol. For example, the NDPA frame may include feedback indication information (or sounding indication information) about which STA measures, which DL channel, how to measure.

Next, the STA may receive an NDP frame from the AP S3420. At this time, the NDP frame received by the STA may include an HE-STF/LTF indicating information about a DL channel to be measured by the STA (or an HE-STF/LTF for sounding (or DL CSI (Channel State Information)) of the DL channel). Also, the NDP frame may include a number of HE-LTFs equal to or larger than the number of spatial streams by which the STA reports the channel state.

Next, the STA may receive a trigger frame from the AP S3430. At this time, the trigger frame received by the STA may include resource allocation information about UL MU resources allocated to individual STAs so that the STAs may perform UL MU transmission of channel state information about the DL channel.

Next, the STA may generate channel state information on the basis of a training field included in the NDP frame S3440. More specifically, the STA may measure the state of the DL channel, which is a measurement target, on the basis of the HE-LTF included in the NDP frame and generate channel state information including the measurement result. At this time, if the AP instructs the STA to provide feedback only for part of the frequency band (through the NDPA frame), the STA may generate channel state information of the corresponding band only.

Next, the STA may perform UL MU transmission of a feedback frame including the generated channels state information S3450. At this time, the STA may perform UL MU transmission of the feedback frame by using the UL MU resources indicated by the trigger frame received at the S3430 step.

In the flow diagram, the STA receives the NDPA frame, NDP frame, and trigger frame sequentially at regular intervals (for example, SIFS) (namely the STA receives the frames through different DL PPDUs), but the present invention is not limited to the description above; to reduce overhead, as described above, the NDPA frame, NDP frame, and trigger frame may be received by the STA by being carried in one DL PPDU. In this case, as described above, in order to avoid transmitting the same information contained in each frame repeatedly, the AP may edit the information contained in the respective frames before transmitting the frames.

Figure 35:
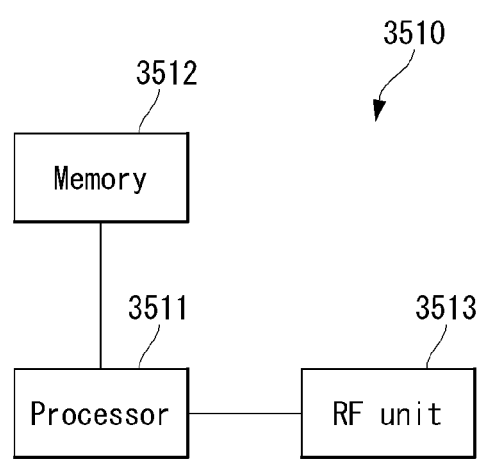
FIG. 35 is a block diagram of each STA device according to an embodiment of the present invention.

FIG. 35 is a block diagram of each STA device according to an embodiment of the present invention.

In FIG. 35, an STA device 3510 may include a memory 3512, a processor 3511 and an RF unit 3513. And, as described above, the STA device may be an AP or a non-AP STA as an HE STA device.

The RF unit 3513 may transmit/receive a radio signal with being connected to the processor 3511. The RF unit 3513 may transmit a signal by up-converting the data received from the processor 3511 to the transmission/reception band.

The processor 3511 may implement the physical layer and/or the MAC layer according to the IEEE 802.11 system with being connected to the RF unit 4013. The processor 3511 may be constructed to perform the operation according to the various embodiments of the present invention according to the drawings and description. In addition, the module for implementing the operation of the STA 3510 according to the various embodiments of the present invention described above may be stored in the memory 3512 and executed by the processor 3511.

The memory 3512 is connected to the processor 3511, and stores various types of information for executing the processor 3511. The memory 3512 may be included interior of the processor 3511 or installed exterior of the processor 3511, and may be connected with the processor 3511 by a well known means.

In addition, the STA device 3510 may include a single antenna or a multiple antenna.

The detailed construction of the STA device 3510 of FIG. 35 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

MODE FOR INVENTION

All embodiments about present invention is described in the best mode.

INDUSTRIAL APPLICABILITY

While a frame transmission scheme in a wireless communication system according to the present invention has been described with respect to its application to an IEEE 802.11 system, it also may be applied to other various wireless communication systems than the IEE 802.11 system.

What is claimed is:

1. A sounding method for a STA (Station) to transmit feedback information of a downlink (DL) channel state in a WLAN (Wireless LAN) system, the method comprising:
receiving an NDPA (NDP announcement) frame that notifies of transmission of an NDP (Null Data Packet) frame;
receiving the NDP frame;
receiving a trigger frame including resource allocation information allocated to the STA;
generating channel state information on a basis of a training field included in the NDP frame; and
performing uplink (UL) multi-user (MU) transmission of a feedback frame including the channel state information by using a frequency resource indicated by the resource allocation information,
wherein the NDPA frame includes indication information of a target frequency band to be measured by the STA,
wherein the target frequency band is a partial frequency band of a frequency band configured for transmitting the NPDA frame, and
wherein the indication information includes (i) a start index and (ii) an end index of a 26 tone resource unit for which the STA is requested feedback.

2. The method of claim 1, wherein the NDPA frame, the NDP frame, and the trigger frame are received by being included in one DL PPDU or by being included in different DL PPDUs respectively.

3. The method of claim 1, wherein, when the NDPA frame, the NDP frame, and the trigger frame are received by being included in different DL PPDUs respectively, the STA receives the different DL PPDUs at SIFS (Short Interframe Space) intervals.

4. The method of claim 1, wherein the resource allocation information indicates a number of resource units allocated to the STA for performing UL MU transmission of the feedback frame.

5. The method of claim 4, wherein the resource unit is a 26 tone resource unit comprising 26 subcarriers.

6. The method of claim 4, wherein a bit value of the resource allocation information indicates the number of resource units allocated to the STA.

7. The method of claim 4,
wherein the resource allocation information includes a plurality of bits corresponding sequentially to resource units allocated for UL MU transmission of the feedback frame, and
wherein each bit value of the plurality of bits is switched to a different bit value from a previous bit value as a STA to which the resource unit corresponding to the bit is allocated, is changed to another STA.

8. The method of claim 4, wherein, when different indices are allocated to the resource units allocated for UL MU transmission of the feedback frame, the resource allocation information includes index information of a resource unit allocated to the STA.

9. The method of claim 1, wherein the channel state information includes a feedback value generated in a predetermined frequency unit with respect to a spatial stream, and the feedback value is an SNR (Signal to Noise Ratio) or beamforming feedback matrix of the predetermined frequency unit with respect to the spatial stream.

10. The method of claim 9, wherein the predetermined frequency unit is formed by a 26 tone resource unit, a 20 MHz channel, or an entire transmission channel of a DL PPDU that carries the NDP frame.

11. The method of claim 1, wherein the channel state information is generated for the target frequency band.

12. The method of claim 11, wherein the generated channel state information is information about a beamforming feedback matrix with respect to the target frequency band.

13. A STA (Station) in a WLAN (Wireless LAN) system, the STA comprising:
an RF (Radio Frequency) unit configured to transmit and receive a radio signal; and
a processor configured to control the RF unit,
wherein the processor is further configured to:
receive an NDPA (NDP announcement) notifying of transmission of an NDP (Null Data Packet) frame,
receive the NDP frame,
receive a trigger frame including resource allocation information allocated to the STA;
generate channel state information on a basis of a training field included in the NDP frame; and
perform uplink (UL) multi-user (MU) transmission of a feedback frame including the channel state information by using a frequency resource indicated by the resource allocation information,
wherein the NDPA frame includes indication information of a target frequency band to be measured by the STA,
wherein the target frequency band is a partial frequency band of a frequency band configured for transmitting the NPDA frame, and
wherein the indication information includes (i) a start index and (ii) and end index of a 26 tone resource unit for which the STA is requested feedback.

* * * * *